(12) United States Patent
Nagaraj et al.

(10) Patent No.: US 10,503,787 B2
(45) Date of Patent: Dec. 10, 2019

(54) SHARING COMMON METADATA IN MULTI-TENANT ENVIRONMENT

(71) Applicant: Oracle International Corporation, Redwood Shores, CA (US)

(72) Inventors: Girish Nagaraj, Bengaluru (IN); Denny McKinney, Los Altos, CA (US); Harry Hsu, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 588 days.

(21) Appl. No.: 15/268,174

(22) Filed: Sep. 16, 2016

(65) Prior Publication Data

US 2017/0109348 A1    Apr. 20, 2017

Related U.S. Application Data

(60) Provisional application No. 62/243,497, filed on Oct. 19, 2015.

(51) Int. Cl.
*G06F 16/93* (2019.01)
*G06F 16/21* (2019.01)
*G06F 16/951* (2019.01)

(52) U.S. Cl.
CPC .............. *G06F 16/93* (2019.01); *G06F 16/21* (2019.01); *G06F 16/211* (2019.01); *G06F 16/951* (2019.01)

(58) Field of Classification Search
CPC ........ G06F 16/93; G06F 16/21; G06F 16/951; G06F 16/211
USPC .................................................. 707/781, 783
See application file for complete search history.

(56) References Cited

U.S. PATENT DOCUMENTS

| | | | |
|---|---|---|---|
| 5,790,778 A | 8/1998 | Bush et al. |
| 5,850,518 A | 12/1998 | Northrup |
| 6,117,180 A | 9/2000 | Dave et al. |
| 6,138,270 A | 10/2000 | Hsu |

(Continued)

OTHER PUBLICATIONS

"Non-Final Office Action" issued in U.S. Appl. No. 15/268,387, dated Sep. 27, 2018, 14 pages.

(Continued)

*Primary Examiner* — Phong H Nguyen
(74) *Attorney, Agent, or Firm* — Kilpatrick Townsend & Stockton LLP

(57) ABSTRACT

The present disclosure relates generally to multi-tenant environments, and more particularly, to techniques for segregating and accessing (e.g., reading and writing) global and tenant base and customization metadata in a multi-tenant environment. One of the techniques includes determining whether a metadata document to be accessed is a global document, if so, accessing the metadata document from a global repository shared amongst tenants of a multi-tenant system, and accessing the metadata document from a tenant repository that is accessible by a tenant of the multi-tenant system when the metadata document is not a global document. The technique futher includes disallowing tenants from directly modifying global metadata to not affect other tenants, but still allow tenants to customize global metadata and store the changes as tenant customization documents in the tenant repository. The tenant repository which can be a database or file system is isolated from other tenants of the multi-tenant system.

16 Claims, 8 Drawing Sheets

(56) References Cited

U.S. PATENT DOCUMENTS

| | | |
|---|---|---|
| 6,397,254 B1 | 5/2002 | Northrup |
| 6,421,705 B1 | 7/2002 | Northrup |
| 6,442,751 B1 | 8/2002 | Cocchi et al. |
| 6,487,713 B1 | 11/2002 | Cohen et al. |
| 6,546,413 B1 | 4/2003 | Northrup |
| 6,601,233 B1 | 7/2003 | Underwood |
| 6,641,746 B2 | 11/2003 | Houge et al. |
| 6,671,713 B2 | 12/2003 | Northrup |
| 6,671,746 B1 | 12/2003 | Northrup |
| 6,715,144 B2 | 3/2004 | Daynes et al. |
| 6,779,000 B1 | 8/2004 | Northrup |
| 6,807,636 B2 | 10/2004 | Hartman et al. |
| 6,901,580 B2 | 5/2005 | Iwanojko et al. |
| 6,922,675 B1 | 7/2005 | Chatterjee et al. |
| 6,922,705 B1 | 7/2005 | Northrup |
| 6,947,992 B1 | 9/2005 | Shachor |
| 6,954,792 B2 | 10/2005 | Kang et al. |
| 6,990,532 B2 | 1/2006 | Day et al. |
| 7,013,461 B2 | 3/2006 | Hellerstein et al. |
| 7,028,019 B2 | 4/2006 | McMillan et al. |
| 7,062,749 B2 | 6/2006 | Cyr et al. |
| 7,086,009 B2 | 8/2006 | Resnick et al. |
| 7,117,216 B2 | 10/2006 | Chakraborty et al. |
| 7,188,158 B1 | 3/2007 | Stanton et al. |
| 7,203,938 B2 | 4/2007 | Ambrose et al. |
| 7,263,686 B2 | 8/2007 | Sadiq |
| 7,343,360 B1 | 3/2008 | Ristanovic et al. |
| 7,349,913 B2 | 3/2008 | Clark et al. |
| 7,505,990 B2 | 3/2009 | Krishna et al. |
| 7,516,492 B1* | 4/2009 | Nisbet .............. G06F 21/554 707/999.001 |
| 7,535,927 B1 | 5/2009 | Northrup |
| 7,536,606 B2 | 5/2009 | Andrews et al. |
| 7,584,207 B2 | 9/2009 | Mortensen et al. |
| 7,590,644 B2 | 9/2009 | Matsakis et al. |
| 7,603,674 B2 | 10/2009 | Cyr et al. |
| 7,644,262 B1 | 1/2010 | Bromley et al. |
| 7,672,986 B2* | 3/2010 | Gilbert .............. G06F 16/50 707/770 |
| 7,721,158 B2 | 5/2010 | Lee |
| 7,774,477 B2 | 8/2010 | Zintel |
| 7,783,782 B2 | 8/2010 | Cromp et al. |
| 7,788,338 B2 | 8/2010 | Savchenko et al. |
| 7,793,340 B2 | 9/2010 | Kiester et al. |
| 7,827,494 B1 | 11/2010 | Hedayatpour et al. |
| 7,840,941 B2 | 11/2010 | Brookins et al. |
| 7,853,899 B1 | 12/2010 | Damaschke et al. |
| 7,865,544 B2 | 1/2011 | Kordun et al. |
| 7,895,512 B2 | 2/2011 | Roberts |
| 7,933,946 B2 | 4/2011 | Livshits et al. |
| 7,945,907 B2 | 5/2011 | Dreiling et al. |
| 7,984,424 B2 | 7/2011 | Dengler et al. |
| 8,015,545 B2 | 9/2011 | Seto et al. |
| 8,108,825 B2 | 1/2012 | Goodwin et al. |
| 8,209,675 B2 | 6/2012 | Zhao et al. |
| 8,560,938 B2 | 10/2013 | Barrow et al. |
| 8,613,108 B1* | 12/2013 | Aggarwal .......... H04L 63/101 455/411 |
| 9,210,149 B2* | 12/2015 | Chang ............... G06F 21/31 |
| 10,078,668 B1 | 9/2018 | Woodrow et al. |
| 2002/0019778 A1* | 2/2002 | Isaacson ........... G06Q 10/087 705/26.1 |
| 2002/0023140 A1 | 2/2002 | Hile et al. |
| 2002/0103660 A1 | 8/2002 | Cramon et al. |
| 2002/0129060 A1 | 9/2002 | Rollins et al. |
| 2002/0143735 A1 | 10/2002 | Ayi et al. |
| 2002/0147757 A1 | 10/2002 | Day et al. |
| 2002/0188613 A1 | 12/2002 | Chakraborty et al. |
| 2003/0005117 A1 | 1/2003 | Kang et al. |
| 2003/0025732 A1 | 2/2003 | Prichard |
| 2003/0034989 A1 | 2/2003 | Kondo |
| 2003/0084424 A1 | 5/2003 | Reddy et al. |
| 2003/0088857 A1 | 5/2003 | Balva et al. |
| 2003/0172127 A1 | 9/2003 | Northrup et al. |
| 2003/0172168 A1 | 9/2003 | Mak et al. |
| 2003/0172193 A1 | 9/2003 | Olsen |
| 2003/0192031 A1 | 10/2003 | Srinivasan et al. |
| 2003/0204518 A1 | 10/2003 | Lang et al. |
| 2003/0204645 A1 | 10/2003 | Sharma et al. |
| 2003/0233631 A1 | 12/2003 | Curry et al. |
| 2003/0233642 A1 | 12/2003 | Hank |
| 2004/0046787 A1 | 3/2004 | Henry et al. |
| 2004/0046789 A1 | 3/2004 | Inanoria |
| 2004/0054991 A1 | 3/2004 | Harres |
| 2004/0064706 A1* | 4/2004 | Lin ................... H04L 63/0428 713/182 |
| 2004/0073565 A1 | 4/2004 | Kaufman et al. |
| 2004/0078424 A1 | 4/2004 | Yairi et al. |
| 2004/0111533 A1 | 6/2004 | Beisiegel et al. |
| 2004/0111673 A1 | 6/2004 | Bowman et al. |
| 2004/0148588 A1 | 7/2004 | Sadiq |
| 2004/0181534 A1 | 9/2004 | Mortensen et al. |
| 2004/0194016 A1 | 9/2004 | Liggitt |
| 2004/0205117 A1 | 10/2004 | Hertling et al. |
| 2004/0205765 A1 | 10/2004 | Beringer et al. |
| 2004/0230639 A1 | 11/2004 | Soluk et al. |
| 2005/0044197 A1 | 2/2005 | Lai |
| 2005/0085928 A1* | 4/2005 | Shani ............... G05B 19/056 700/18 |
| 2005/0183074 A1 | 8/2005 | Alexander et al. |
| 2005/0193061 A1 | 9/2005 | Schmidt et al. |
| 2005/0223361 A1 | 10/2005 | Belbute |
| 2005/0251788 A1 | 11/2005 | Henke et al. |
| 2005/0273772 A1 | 12/2005 | Matsakis et al. |
| 2006/0010163 A1 | 1/2006 | Herzog et al. |
| 2006/0015847 A1 | 1/2006 | Carroll et al. |
| 2006/0031750 A1 | 2/2006 | Waldorf et al. |
| 2006/0036463 A1 | 2/2006 | Patrick et al. |
| 2006/0075387 A1 | 4/2006 | Martin et al. |
| 2006/0080117 A1 | 4/2006 | Carr et al. |
| 2006/0101038 A1 | 5/2006 | Gabriel et al. |
| 2006/0106626 A1 | 5/2006 | Jeng et al. |
| 2006/0123414 A1 | 6/2006 | Fors et al. |
| 2006/0130047 A1 | 6/2006 | Burugapalli |
| 2006/0136832 A1 | 6/2006 | Keller et al. |
| 2006/0143229 A1 | 6/2006 | Bou-ghannam et al. |
| 2006/0150156 A1 | 7/2006 | Cyr et al. |
| 2006/0165105 A1 | 7/2006 | Shenfield et al. |
| 2006/0168132 A1 | 7/2006 | Bunter et al. |
| 2006/0168355 A1 | 7/2006 | Shenfield et al. |
| 2006/0168557 A1 | 7/2006 | Agrawal et al. |
| 2006/0184866 A1 | 8/2006 | Rees |
| 2006/0206858 A1 | 9/2006 | Becker et al. |
| 2006/0235733 A1 | 10/2006 | Marks |
| 2006/0235986 A1 | 10/2006 | Kim |
| 2006/0242636 A1 | 10/2006 | Chilimbi et al. |
| 2006/0253490 A1 | 11/2006 | Krishna et al. |
| 2006/0265702 A1 | 11/2006 | Isaacson et al. |
| 2006/0271537 A1 | 11/2006 | Chandrasekharan et al. |
| 2006/0277542 A1 | 12/2006 | Wipfel |
| 2006/0294474 A1 | 12/2006 | Taylor et al. |
| 2006/0294506 A1 | 12/2006 | Dengler et al. |
| 2007/0016429 A1 | 1/2007 | Bournas et al. |
| 2007/0055936 A1 | 3/2007 | Dhanjal et al. |
| 2007/0106975 A1 | 5/2007 | DeLine |
| 2007/0113191 A1 | 5/2007 | Keller et al. |
| 2007/0130205 A1 | 6/2007 | Dengler et al. |
| 2007/0157078 A1 | 7/2007 | Anderson |
| 2007/0169199 A1 | 7/2007 | Quinnell et al. |
| 2007/0174763 A1 | 7/2007 | Chang et al. |
| 2007/0174822 A1 | 7/2007 | Moser et al. |
| 2007/0203956 A1 | 8/2007 | Anderson et al. |
| 2007/0220429 A1 | 9/2007 | Kureshy et al. |
| 2007/0240096 A1 | 10/2007 | Pontoppidan et al. |
| 2007/0245340 A1 | 10/2007 | Cohen et al. |
| 2007/0271552 A1 | 11/2007 | Pulley |
| 2007/0277095 A1 | 11/2007 | Ukigawa |
| 2007/0282885 A1 | 12/2007 | Baude et al. |
| 2007/0294586 A1 | 12/2007 | Parvathy et al. |
| 2007/0294664 A1 | 12/2007 | Joshi |
| 2008/0004887 A1 | 1/2008 | Brunswig et al. |
| 2008/0028302 A1 | 1/2008 | Meschkat |
| 2008/0065675 A1 | 3/2008 | Bozich et al. |

(56) References Cited

U.S. PATENT DOCUMENTS

| | | |
|---|---|---|
| 2008/0070593 A1* | 3/2008 | Altman ................ H04W 4/029 455/457 |
| 2008/0077848 A1 | 3/2008 | Roberts |
| 2008/0083012 A1 | 4/2008 | Yu et al. |
| 2008/0104617 A1 | 5/2008 | Apacible et al. |
| 2008/0120557 A1 | 5/2008 | offenhartz et al. |
| 2008/0126396 A1 | 5/2008 | Gagnon |
| 2008/0127087 A1 | 5/2008 | Brookins et al. |
| 2008/0127124 A1 | 5/2008 | Gilfix et al. |
| 2008/0162304 A1 | 7/2008 | Ourega |
| 2008/0163164 A1 | 7/2008 | Chowdhary et al. |
| 2008/0168420 A1 | 7/2008 | Sabbouh |
| 2008/0183479 A1 | 7/2008 | Iwashita et al. |
| 2008/0183744 A1 | 7/2008 | Adendorff et al. |
| 2008/0184201 A1 | 7/2008 | Burns et al. |
| 2008/0189358 A1 | 8/2008 | Charles |
| 2008/0196024 A1 | 8/2008 | Barfield et al. |
| 2008/0243901 A1 | 10/2008 | Super et al. |
| 2008/0250313 A1 | 10/2008 | Kamdar et al. |
| 2008/0275844 A1 | 11/2008 | Buzsaki et al. |
| 2008/0276218 A1 | 11/2008 | Taylor et al. |
| 2008/0276260 A1 | 11/2008 | Garlick et al. |
| 2008/0295109 A1 | 11/2008 | Huang et al. |
| 2008/0313648 A1 | 12/2008 | Wang et al. |
| 2009/0006167 A1 | 1/2009 | Toussaint et al. |
| 2009/0031280 A1 | 1/2009 | Koehler |
| 2009/0083297 A1 | 3/2009 | Pohl et al. |
| 2009/0106494 A1 | 4/2009 | Knebel |
| 2009/0144716 A1 | 6/2009 | Felts |
| 2009/0144729 A1 | 6/2009 | Guizar |
| 2009/0150565 A1 | 6/2009 | Grossner et al. |
| 2009/0157859 A1 | 6/2009 | Morris |
| 2009/0158237 A1 | 6/2009 | Zhang et al. |
| 2009/0178020 A1 | 7/2009 | Goodwin et al. |
| 2009/0204567 A1 | 8/2009 | Barrow |
| 2009/0204629 A1 | 8/2009 | Barrow |
| 2009/0204884 A1 | 8/2009 | Barrow et al. |
| 2009/0204943 A1 | 8/2009 | Konduri |
| 2009/0205013 A1 | 8/2009 | Lowes |
| 2009/0217153 A1 | 8/2009 | Oshima et al. |
| 2009/0259993 A1 | 10/2009 | Konduri et al. |
| 2009/0292797 A1 | 11/2009 | Cromp et al. |
| 2009/0313256 A1 | 12/2009 | Konduri et al. |
| 2010/0057482 A1 | 3/2010 | Radhakrishnan et al. |
| 2010/0057836 A1 | 3/2010 | Anbuselvan |
| 2010/0070553 A1 | 3/2010 | Addala et al. |
| 2010/0070973 A1 | 3/2010 | Addala et al. |
| 2010/0082556 A1 | 4/2010 | Srinivasan et al. |
| 2010/0132009 A1 | 5/2010 | Khemani et al. |
| 2010/0146291 A1 | 6/2010 | Anbuselvan |
| 2010/0191779 A1* | 7/2010 | Hinrichs ................ G06F 3/0605 707/822 |
| 2010/0236660 A1 | 9/2010 | Ozanne et al. |
| 2010/0313038 A1 | 12/2010 | Bradley et al. |
| 2011/0023071 A1 | 1/2011 | Li et al. |
| 2011/0072431 A1 | 3/2011 | Cable et al. |
| 2011/0119649 A1 | 5/2011 | Kand et al. |
| 2011/0119651 A1* | 5/2011 | Utschig-Utschig ....... G06F 8/35 717/107 |
| 2011/0225232 A1 | 9/2011 | Casalaina et al. |
| 2012/0260228 A1 | 10/2012 | Mallick et al. |
| 2013/0055118 A1 | 2/2013 | Donovan et al. |
| 2013/0086568 A1 | 4/2013 | Krishnamurthy |
| 2013/0173720 A1 | 7/2013 | Vasudev et al. |
| 2014/0019407 A1 | 1/2014 | Wong |
| 2014/0047507 A1* | 2/2014 | Chang ..................... G06F 21/31 726/3 |
| 2014/0215590 A1 | 7/2014 | Brand |
| 2015/0067128 A1 | 3/2015 | Naseh et al. |
| 2015/0186668 A1* | 7/2015 | Whaley ................... G06F 16/16 713/156 |
| 2015/0317339 A1 | 11/2015 | Vranyes et al. |
| 2016/0094626 A1 | 3/2016 | Bajaj et al. |
| 2016/0371021 A1 | 12/2016 | Goldberg et al. |
| 2017/0003830 A1* | 1/2017 | Kessler ............... H04L 67/1097 |
| 2017/0091231 A1 | 3/2017 | DiFranco et al. |

OTHER PUBLICATIONS

Belsiegel et al., "SCA Service Component Architecture—Assembly Model Specification", SCA version 1.00, BEA Systems, Inc., Mar. 15, 2007, 91 pages.

"Business Process Language (BPEL) and Oracle BPEL Process Manager", Oracle FAQ, Available online at: http://www.oracle.com/tech no logy/prod ucts/ias/bpel/htdocs/orabpel_faq. html template= . . . , Accessed from Internet on Nov. 11, 2009, 3 pages.

Chapman et al., "SCA Service Component Architecture—Client and Implementation Model Specification for WS-BPEL", SCA version 1.00, BEA Systems, Inc., Mar. 21, 2007, 15 pages.

Chappell, "Introducing SCA", David Chappell & Associates, Jul. 2007, pp. 1-22.

"Client-Server Modernization—From Oracle® Forms to Java", VGO Software Products, Available online at: http://www.vgosoftware.com/products/evo/index.php, Accessed from Internet on Aug. 28, 2009, 3 pages.

"Exodus-Main Features & Benefits", CipherSoft Inc, Available online at: http://www.ciphersoftinc.com/products/expdus-features benefits.html, Accessed from Internet on Aug. 28, 2009, 3 pages.

"Exodus™ Products", CipherSoft Inc., Available online at: http://www.ciphersoftinc.com/products/migration-products-overview.html, Accessed from Internet on Aug. 28, 2009, 3 pages.

Shepherd, "Oracle SCA—The Power of the Composite", An Oracle White Paper, Aug. 2009, pp. 1-19.

"Oracle Forms to Java Modernization", VGO Software Information, Available online at: http://www.vgosoftware.com/products/evo/walkthrough.php, Accessed from Internet on Aug. 28, 2009, 5 pages.

"VGO Software First to Convert Oracle Forms to Oracle ADF V11", VGO News, Available online at: http://www.vgosoftware.com/abouUnews/view article.phpnew id=35, Sep. 16, 2008, 2 pages.

"Final Office Action" issued in U.S. Appl. No. 12/029,605, dated Sep. 28, 2010, 13 pages.

"Final Office Action" issued in U.S. Appl. No. 12/029,605, dated Oct. 13, 2010, 13 pages.

"Non-Final Office Action" issued in U.S. Appl. No. 12/138,997, dated Jun. 24, 2011, 15 pages.

"Non-Final Office Action", issued in U.S. Appl. No. 12/203,816, dated Sep. 2, 2010, 17 pages.

"Final Office Action", issued in U.S. Appl. No. 15/268,387, dated Jan. 28, 2019, 11 pages.

Ajax & Security: Vulnerability in DWR Security Logic Identified Can Potentially be exploited to launce DoS attacks and break into back-end servers, AjaxWorld™ Magazine, downloaded on Oct. 6, 2008 from http:/lajax.sys-con.com/node/319868, Jan. 8, 2007, 4 pages.

Direct Web Remoting, About DWR's JavaScript Security, downloaded from http://directwebremoting.org/dwr/security/script-tag-protection, Oct. 6, 2008, 4 pages.

Direct Web Remoting, DWR version 2—New and Noteworthy, downloaded from http://directwebremoting.org/dwr/changelog/dwr20, Dec. 5, 2008, 4 pages.

Direct Web Remoting, DWR: Easy Ajax for Java, downloaded from http://directwebremoting.org/dwr/overview/dwr, Oct. 6, 2008, 2 pages.

Direct Web Remoting, Safari, GET and Request Forgery, downloaded from http://directwebremoting.org/dwr/security/allowGetForSafariButMakeForgeryEasier, Oct. 6, 2008, 1 page.

Direct Web Remoting, Security, downloaded from http://directwebremoting.org/dwr/security, Oct. 6, 2008, 4 pages.

Dynamic Structure in ADF UIX Pages, Oracle ADF UIX Developer's Guide, downloaded from http://www.oracle.com/webapps/online-help/jdeveloper/10.1.2/state/content/navId.4/navSetId./vtAnchor.DeltaTreePvtTopicFile.uixheip%7Cuixdevguide%7Cdynamic%7Ehtml/, Apr. 21, 2008, pp. 1-11.

Google Web Toolkit, Product Overview, downloaded from http://code.google.com/webtoolkiUoverview.html, Oct. 6, 2008, 3 pages.

(56) References Cited

OTHER PUBLICATIONS

Oracle Application Framework, Oracle, Dec. 2006, pp. 1-242.
Altenhofen et al., ASMs in Service Oriented Architectures, Journal of Universal Computer Science, vol. 14, No. 12, 2008, 25 pages.
Box et al., Web Services Addressing (WS-Addressing), http://www.w3.org/Submission/ws-addressing/#Toc77464317, Aug. 18, 2009, 23 pages.
Carey et al., Making BPEL Processes Dynamic, Oracle Technology Network, Aug. 18, 2009, 8 pages.
Claypool et al., Optimizing Performance of Schema Evolution Sequences, Objects and Databases, Lecture Notes in Computer Science vol. 1944, Mar. 1999, pp. 114-127.
Curphey et al., Web Application Security Assessment Tools, IEEE, 2006, pp. 32-41.
Di Paola et al., Subverting Ajax, 23rd CCC Conference, Dec. 2006, pp. 1-8.
Hildebrandt, Web-based Document Management, BTU 2001, 2001, pp. 1-22.
Hohpe et al., Messaging Systems, Enterprise Integration Patterns Chapter 3, Pearson Education, Inc, Boston, Massachusetts, 2004, 45 pages.
Ma, Discovery-Based Service Composition, National Central University, Doctoral Dissertation, Jan. 2007, 109 pages.
Mietzner et al., Defining Composite Configurable SaaS Application Packages Using SCA Variability Descriptors and Multi-Tenancy Patters, Third International Conference on Internet and Web Applications and Services, 2008. ICIW '08, Jun. 2008, pp. 156-161.
Nagappan et al., XML Processing and Data Binding with Java APIs, Developing Java Web Services: Architecting and Developing Secure Web Services Using Java [online] Retrieved from Internet :<http://java.sun.com/developer/Books/j2ee/devjws/>, 2003, pp. 313-399.
Phanouriou, UIML: A Device-Independent User Interface Markup Language, Virginia Polytechnic Institute and State University, Sep. 26, 2000, 172 pages.
Phillips, File and Registry Virtualization—the good, the bad and the ugly, Window's Connected UserID : Jerry. Jerry's Incoherent Babbling:<http://windowsconnected.com/blogsfjerry/archive/2005/12/19/file-and-registry-virtualization-the-good-the thebad-and-the-ugly.aspx>, Dec. 19, 2005, 6 pages.
Smith, Portals: Toward an Application Framework for Interoperability, Communications of the ACM, vol. 47, issue 10, Oct. 2004, pp. 93-97.
Steinberg, Data Binding with JAXB, <https://www6.software.ibm.com/developerworks/education/x-jaxb/x-jaxb-a4.pdf>, 2003, pp. 1-34.
Yang et al., Web Component: A Substrate for Web Service Reuse and Composition, Proceedings of the 14th International Conference on Advanced Information Systems Engineering, 2002, pp. 21-36.
Zhang et al., Schema Based XML Security: RBAC Approach, IFIP International Federation for Information Processing vol. 142, 2004, pp. 330-343.
U.S. Appl. No. 12/029,600, Final Office Action dated Oct. 19, 2011, 21 pages.
U.S. Appl. No. 12/029,600, Non-Final Office Action dated Sep. 17, 2012, 24 pages.
U.S. Appl. No. 12/029,600, Non-Final Office Action dated Apr. 27, 2011, 29 pages.
U.S. Appl. No. 12/029,600, Notice of Allowance dated Jun. 11, 2013, 6 pages.
U.S. Appl. No. 12/029,600, Notice of Allowance dated Nov. 7, 2012, 9 pages.
U.S. Appl. No. 12/029,600, Notice of Allowance dated Feb. 5, 2013, 9 pages.
U.S. Appl. No. 12/029,605, Final Office Action dated Nov. 2, 2011, 13 pages.
U.S. Appl. No. 12/029,605, Non-Final Office Action dated May 12, 2010, 11 pages.
U.S. Appl. No. 12/029,605, Non-Final Office Action dated Jul. 20, 2011, 13 pages.
U.S. Appl. No. 12/029,605, Non-Final Office Action dated Apr. 10, 2013, 14 pages.
U.S. Appl. No. 12/029,609, Final Office Action dated Nov. 8, 2011, 13 pages.
U.S. Appl. No. 12/029,609, Non-Final Office Action dated May 26, 2010, 15 pages.
U.S. Appl. No. 12/029,609, Non-Final Office Action dated Jul. 28, 2011, 14 pages.
U.S. Appl. No. 12/029,609, Notice of Allowance dated Feb. 4, 2013, 24 pages.
U.S. Appl. No. 12/029,615, Advisory Action dated Oct. 16, 2012, 5 pages.
U.S. Appl. No. 12/029,615, Final Office Action dated Jul. 31, 2012, 33 pages.
U.S. Appl. No. 12/029,615, Non-Final Office Action dated Feb. 15, 2012, 28 pages.
U.S. Appl. No. 12/029,724, Final Office Action dated Apr. 30, 2013, 22 pages.
U.S. Appl. No. 12/029,724, Final Office Action dated May 5, 2011, 20 pages.
U.S. Appl. No. 12/029,724, Non-Final Office Action dated Dec. 14, 2010, 22 pages.
U.S. Appl. No. 12/029,724, Non-Final Office Action dated Jan. 7, 2013, 31 pages.
U.S. Appl. No. 12/101,420, Final Office Action dated Feb. 24, 2012, 20 pages.
U.S. Appl. No. 12/101,420, Non-Final Office Action dated Oct. 5, 2011, 18 pages.
U.S. Appl. No. 12/138,997, Final Office Action dated Dec. 5, 2011, 13 pages.
U.S. Appl. No. 12/203,816, Final Office Action dated Jan. 20, 2011, 23 pages.
U.S. Appl. No. 12/203,816, Non-Final Office Action dated Oct. 26, 2012, 30 pages.
U.S. Appl. No. 12/210,657, Final Office Action dated Apr. 3, 2012, 24 pages.
U.S. Appl. No. 12/210,657, Non-Final Office Action dated Sep. 30, 2011, 22 pages.
U.S. Appl. No. 12/210,657, Non-Final Office Action dated Apr. 25, 2011, 23 pages.
U.S. Appl. No. 12/210,657, Notice of Allowance dated Jun. 26, 2012, 7 pages.
U.S. Appl. No. 12/212,599, Non-Final Office Action dated Dec. 22, 2011, 11 pages.
U.S. Appl. No. 12/212,599, Non-Final Office Action dated Aug. 2, 2012, 14 pages.
U.S. Appl. No. 12/330,008, Final Office Action dated Apr. 10, 2012, 14 pages.
U.S. Appl. No. 12/330,008, Non-Final Office Action dated Dec. 21, 2011, 15 pages.
U.S. Appl. No. 12/330,008, Notice of Allowance dated Aug. 7, 2012, 17 pages.
U.S. Appl. No. 12/330,008, Notice of Allowance dated Jun. 11, 2012, 8 pages.
U.S. Appl. No. 12/487,004, Advisory Action dated May 24, 2012, 3 pages.
U.S. Appl. No. 12/487,004, Final Office Action dated Mar. 19, 2012, 31 pages.
U.S. Appl. No. 12/487,004, Non-Final Office Action dated Sep. 28, 2011, 29 pages.
U.S. Appl. No. 12/790,437, Final Office Action dated Jan. 30, 2013, 26 pages.
U.S. Appl. No. 12/790,445, Non-Final Office Action dated Dec. 19, 2012, 23 pages.
U.S. Appl. No. 15/268,387, filed Sep. 16, 2016. 52 pages.
Metadata Services (MDS) in Fusion Middleware 11g, An Oracle White Paper, Dec. 2009, 22 pages.
Oracle Data Integrator 12c Architecture Overview, An Oracle White Paper, Feb. 2014, 8 pages.
U.S. Appl. No. 15/268,387, Final Office Action dated Apr. 25, 2019, 11 pages.
U.S. Appl. No. 15/268,387 received a Non-Final Office Action dated Aug. 12, 2019, 12 pages.

* cited by examiner

SHARING COMMON METADATA IN MULTI-TENANT ENVIRONMENT

CROSS-REFERENCE TO RELATED APPLICATIONS

The present application is a non-provisional application of, and claims the benefit and priority under 35 U.S.C. 119(e) of U.S. Provisional Application No. 62/243,497, filed Oct. 19, 2015, entitled "SHARING COMMON METADATA IN MULTI-TENANT ENVIRONMENT," and is related to U.S. Provisional Application No. 62/235,313, filed on Sep. 30, 2015 entitled "MULTI-TENANT CUSTOMIZABLE COMPOSITES" and U.S. application Ser. No. 15/268,387, filed on Sep. 16, 2016 entitled "MULTI-TENANT CUSTOMIZABLE COMPOSITES,". The entire contents of the aforementioned applications are incorporated herein by reference for all purposes.

BACKGROUND

The present disclosure relates generally to multi-tenant environments, and more particularly, to techniques (e.g., systems, methods, computer program products storing code or instructions executable by one or more processors) for segregating and accessing global and tenant metadata in a multi-tenant environment.

The software industry is adopting multi-tenancy to achieve more economical usage of hardware through higher density and reduced maintenance cost. Multi-tenancy is a mode of operation of software where multiple independent instances of one or multiple applications operate in a shared environment. In a multi-tenant architecture, a single instance of software runs on a server and serves multiple tenants. A tenant is a user or a group of users who share a common access with specific privileges to the software instance. For example, a tenant can be a company or a business.

A primary constraint of a multi-tenant architecture is that each tenant's private data and metadata has to be stored in a tenant-isolated database or file system storage. Nonetheless, it is often the case that multiple tenants use common (i.e., shared or global) metadata such as application view and business component definitions because the same application is accessed by multiple tenants. The challenge is how to persist and access common metadata for all tenants in an optimal and secure method. The common industry solution is to duplicate the common metadata into each tenant's storage during tenant provisioning and application deployment. The common metadata is thus duplicated for each tenant.

However, conventional multi-tenant architecture does not have support for the sharing of the common metadata across tenants while maintaining the segregation of tenant private metadata. This has several problems including: (i) any updates to shared global metadata will be lost when the application is upgraded because it will be overwritten during deployment of the next version of the application, (ii) lifecycle and security are co-mingled, which makes patching and upgrading difficult, (iii) duplicating global metadata for each tenant results in increased storage cost, and (iv) shared objects cannot be efficiently cached.

Therefore, a method for efficiently segregating, storing, and accessing global and tenant metadata in a multi-tenant environment is desired.

BRIEF SUMMARY

Embodiments of the present invention address the foregoing and other such problems by providing techniques for segregating and accessing global and tenant metadata in a multi-tenant environment.

According to one embodiment, a method is performed by a computing system, and the method includes determining whether a base document to be accessed is a global document, accessing the base document from a global repository shared amongst tenants of a multi-tenant system when the base document is the global document, and accessing the base document from a tenant repository that is accessible by a tenant of the multi-tenant system when the base document is not the global document. The tenant repository is isolated from other tenants of the multi-tenant system. Optionally, the determining whether the base document to be accessed is the global document includes analyzing a namespace of the base document to determine whether the namespace is identified as global.

According to another embodiment, a non-transitory machine readable storage medium is provided having instructions stored thereon that when executed by one or more processors cause the one or more processors to perform a method that includes determining whether a base document to be accessed is a global document, accessing the base document from a global repository shared amongst tenants of a multi-tenant system when the base document is the global document, and accessing the base document from a tenant repository that is accessible by a tenant of the multi-tenant system when the base document is not the global document. The tenant repository is isolated from other tenants of the multi-tenant system. Optionally, the determining whether the base document to be accessed is the global document includes analyzing a namespace of the base document to determine whether the namespace is identified as global.

According to another embodiment, a system is provided that includes one or more processors and non-transitory machine readable storage medium, program instructions to determine whether a base document to be accessed is a global document, program instructions to access the base document from a global repository shared amongst tenants of a multi-tenant system when the base document is the global document, and program instructions to access the base document from a tenant repository that is accessible by a tenant of the multi-tenant system when the base document is not the global document. The tenant repository is isolated from other tenants of the multi-tenant system, and the program instructions are stored on the non-transitory machine readable storage medium for execution by the one or more processors. Optionally, the determining whether the base document to be accessed is the global document includes analyzing a namespace of the base document to determine whether the namespace is identified as global.

In some embodiments, the accessing the base document from the global repository includes reading the base document from the global repository, and the accessing the base document from the tenant repository includes reading the base document from the tenant repository. In accordance with such aspects, the method may further include determining whether a context requesting to read the base document is global when the base document is not the global document and prior to reading the base document from the tenant repository, rejecting the read when (i) the base document is not the global document, and (ii) the context requesting the base document is global, and reading the base document from the tenant repository when (i) the base document is not the global document, and (ii) the context requesting the base document is not global.

Optionally, the method further includes determining whether there is a customization document to be read, determining whether the customization document to be read is a global customization document when there is the customization document to be read, reading the customization document from the global repository when the customization document is the global customization document, and reading the customization document from the tenant repository when the customization document is not the global customization document. The determining whether the customization document to be read is the global customization document may include analyzing the layer name of the customization document to determine whether the layer name is identified as global.

Optionally, the method further includes determining whether the context requesting to read the customization document is global when the customization document is not the global customization document and prior to reading the customization document from the tenant repository, rejecting the read when (i) the customization document is not the global customization document, and (ii) the context requesting the customization document is global, and reading the customization document from the tenant repository when (i) the customization document is not the global customization document, and (ii) the context requesting the customization document is not global.

In alternative or additional embodiments, the determining whether the base document to be accessed is the global document includes determining whether the base document or a customization document to be accessed is the global document. In accordance with such aspects, the method may further include determining whether a context requesting access to the base document or customization document is global, writing the base document or customization document in the global repository when (i) the base document or customization document to be accessed is the global document, and (ii) the context requesting access to the base document or customization document is global, and writing the base document or customization document in the tenant repository when (i) the base document or customization document is not the global document, and (ii) the context requesting access to the base document or customization document is not global.

Optionally, the method further includes rejecting the writing when (i) the base document or customization document is the global document; (ii) the context requesting the base document or customization document is not global, and (iii) a tenant customization layer is not configured.

Optionally, the method further includes writing changes to metadata of the base document or customization document as a customization when (i) the base document or customization document is the global document; (ii) the context requesting the base document or customization document is not global, and (iii) a tenant customization layer is configured.

The foregoing, together with other features and embodiments will become more apparent upon referring to the following specification, claims, and accompanying drawings.

DETAILED DESCRIPTION

Figure 1:
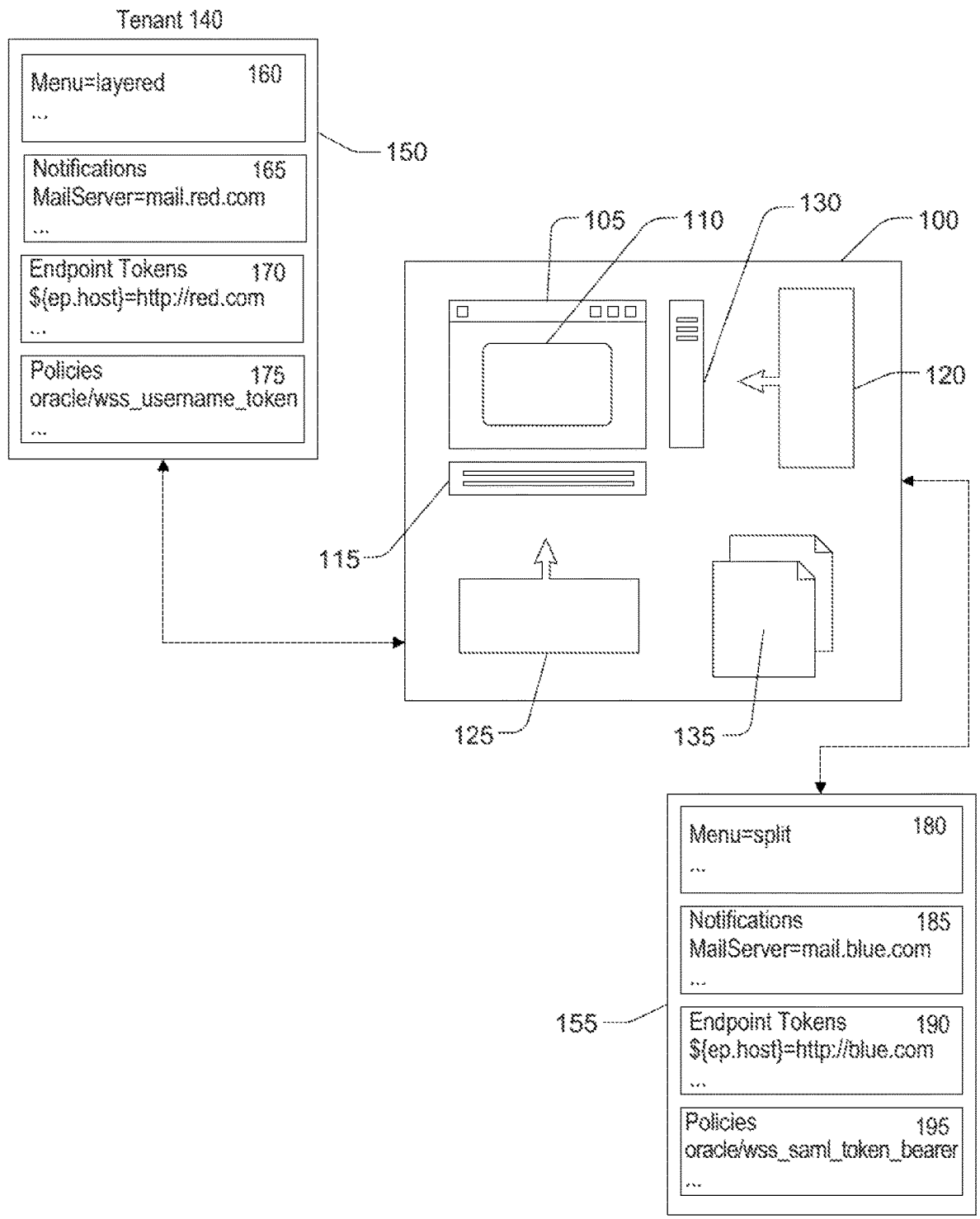
FIG. 1 illustrates a shared application in accordance with some embodiments.

In the following description, for the purposes of explanation, specific details are set forth in order to provide a thorough understanding of the embodiments described herein. However, it will be apparent that various embodiments may be practiced without these specific details. The figures and description are not intended to be restrictive.

Application servers generally provide a managed environment within which software applications can be deployed and run. Cloud-based environments allow applications to run within and take advantage of the distributed resources provided by a cloud. Such environments can support large numbers of tenants running software applications, which may have characteristics such as application view and business component definitions that are common amongst all tenants (i.e., global) and other characteristics that are particular to that tenant (i.e., tenant specific base documents created at runtime or tenant customizations to global base documents). These characteristics are commonly defined for the software applications in global metadata and tenant metadata. In order to persist and access the global metadata for all tenants in an optimal and secure method, the common industry solution has been to duplicate the global metadata into each tenant's storage during tenant provisioning and application deployment since conventional multi-tenant systems do not have support for the sharing of the global metadata across all tenants while maintaining the segregation of tenant metadata.

To address the needs for sharing global metadata across all tenants and at the same time ensuring tenant isolation for tenant metadata, described herein are systems and methods for supporting multi-tenancy in an application server, cloud, or other environment. In some embodiments, the systems and methods described herein allow for global metadata to be stored in a central global storage and accessed by all tenants, while at the same time enabling the global metadata to be customized using multi-layer customizations to create tenant specific metadata, and the tenant specific metadata to be stored in a tenant's private storage. This is a generic solution that can be implemented for any type of metadata and applied to any layer (business objects, presentation, etc.) as opposed to domain specific proprietary technologies. Further, this generic solution is achieved without duplicating the global metadata in each tenant's storage while still allowing for the global metadata to be updated by individual tenants using multi layered customizations. Specifically, multiple tenants are able to customize global metadata and such customizations are performed at tenant specific customization layers that are stored in each tenant's private storage. In some embodiments, the customization capability is contained within a metadata engine and deployed via Meta Data Services (MDS). MDS can be used for storing the metadata and backs the application or system software component at design-time and runtime. Accordingly, any application or system software component driven by metadata may use the metadata engine and MDS to support customization and storage with minimal changes.

The embodiments of the present invention are applicable to various kinds and types of global metadata and tenant metadata, and may be used in a variety of different domains and contexts. Some embodiments are particularly applicable to enterprise application software provided in a multi-tenant architecture, which is commonly customized to meet the business requirements of specific tenants (e.g., customers). The metadata may include but is not restricted to MetaData Services (MDS) metadata objects such as Extensible Markup Language (XML) documents and non-XML documents. Certain embodiments are also applicable to other kinds of metadata, such as any application-specific metadata.

As used herein, a "base document" or "base metadata document" is a document that defines one or more non-customized characteristics of at least a portion of a software application. In various embodiments, these characteristics may correspond to the content, behavior, and/or appearance of the application. For example, a base metadata document "X.xml" may define a page layout for a user interface of an application. Examples of a base metadata document include but are not restricted to java server pages XML (JSPX) documents that define a user interface of an application, component definitions, rule files, etc. However as should be understood, the techniques described herein are also applicable to other kinds of metadata, such as any application-specific metadata.

As used herein, a "customization document" or "customization metadata document" is a document that defines one or more modifications to a base metadata document. Thus, a customization "custX.xml" may specify a rearrangement of the page layout defined in the base metadata document "X.xml." As described in greater detail below, some embodiments allow an arbitrary number of customizations to be defined for, and applied to, a given base metadata document.

As used herein, a "tenant" includes one or more users. For example, a tenant can be a company and a user or group of users can include one or more employees of the company. The group of user users may have one or more tenancies.

FIG. 1 illustrates a shared software application 100 such as enterprise application software to be distributed in a multi-tenant environment, in accordance with some exemplary embodiments. As shown in FIG. 1, the shared software application 100 can include interface 105, service 110, properties 115, module 120, module 125, and reference 130. The shared software application 100 can include one or more base metadata documents 135 that can be customized by a tenant 140; 145 to tailor the shared software application 100 to satisfy requirements that are particular to that tenant 140; 145.

For example, the one or more base metadata documents 135 can be customized according to each tenant 140; 145 using customization layers 150; 155. In some embodiments, customization layers 150; 155 can include interface settings, business rules, human task definitions, domain value maps, Extensible Stylesheet Language Transformations (XSLT), Oracle Web Services Manager (OWSM) Web Service Policies, notification settings, composite properties, and endpoint tokens for access to external service endpoints.

As shown in FIG. 1, tenants 140 and 145 can customize characteristics including the content, behavior, and/or appearance of the shared software application 100. The tenant 140 using one or more customization layers 150 can customize, for example, the graphical user interface 160, notifications 165, endpoint tokens 170, and policies 175 of the shared software application 100. The tenant 145 using one or more customization layers 155 can customize, for example, the graphical user interface 180, notifications 185, endpoint tokens 190, and policies 195 of the shared software application 100. Graphical user interface customizations 160 and 180 can include menu and toolbar customizations to reduce visual complexity and interaction efficiency. An example of a menu customization would include a layered approach versus a split menu approach. Notifications 165 and 185 can include configuring notifications in a module 120 and module 125, respectively. Notifications can be customized so as to be sent to mail servers based on, for example, a customer or based on rules as to who should be notified. End point tokens 170 and 190 can include, for example, external reservation systems which are on a different system or server from that of a customer. The end point tokens 170 and 190 can be customized for a reference 130. Policies 175 and 195 can include configuring the behavior of service 110, module 120, module 125, and reference 130. For example, customizing a type of security, user authentication, or encryption standard.

In order to enable sharing of metadata (e.g., the one or more base metadata documents 135 and/or the customization layers 150; 155) between tenants 140 and 145, the metadata are segregated based on namespaces using a configuration as shown below. For example, customers can set "BaseTenantScope" for namespace to "Global" for any namespace that is shared across all tenants. In some embodiments, the tenant-scope applies to only base metadata since for customizations the tenant-scope is configured on a per layer basis. Any layers not declared so will be assumed as tenant scoped. Hence, only global customization layers need to be declared. Similarly, namespaces may be considered tenant scope by default so only global namespaces need to be declared. In accordance with these aspects, a global namespace can have tenant customizations, and global metadata can be updated in a non-global tenant context using a tenant customization layer. For customizations developed using customization layers, global or tenant scope may be determined by comparing the layer name against configuration. For example: App may configure "site" layer as "Global" and "user" layer as tenant. Accordingly, a customization document for site/siteA will be a global document and the same customization document for user/John will be a tenant customization document.

Configuration Example

[MDS Configuration]
  [NameSpaces]
  REM Only global namespaces need to be explicitly configured with
  REM BaseTenantScope as Global, default value is Tenant
  [Namespace path="/enterprise/apps/menu" BaseTenantScope="Global"]
  REM [Namespace path="/enterprise/webcenter/lock"]
  [Customizations]
  REM Only global customization layers need to be configured
  [Layer Name="site" TenantScope="Global"]
  REM [Layer Name="user"]

During design or runtime processing of application 100, the systems and methods described herein may be configured to determine a tenant context from which a request is received (e.g., a security context), for example, whether a request to access (read/write) metadata is executed by a tenant 140; 145 or a global user such as a global administrator. In some embodiments, an Application Server provides an application program interface (API) to determine whether the tenant context is tenant or global based on the security context. The systems and methods described herein may be further configured determine the tenant scope of the document by checking the document name against the namespaces and customization layers in the configuration as shown in the configuration example above. When the metadata is identified to be global, the metadata is accessed from the global database or file storage. When the metadata is identified not to be global (i.e., tenant private metadata), the metadata is accessed from the tenant's private storage.

For example, when trying to access (read/write) a metadata document, the systems and methods described herein will consider the TenantScope of the document and current Tenant Context and take the appropriate action (e.g., read/write from a pluggable database (PDB) or a tenant top level directory (TLD), or reject operation), as outlined in Table 1 (read) and Table 2 (write, e.g., create/save/delete/rename document).

TABLE 1

| TenantScope of document | Tenant Context | Action |
|---|---|---|
| Global | Global | Read from global PDB/TLD |
| Global | Tenant | Read from global PDB/TLD |
| Tenant | Global | Reject operation |
| Tenant | Tenant | Read from tenant PDB/TLD |

TABLE 2

| TenantScope of document | Tenant Context | Action |
|---|---|---|
| Global | Global | Write to global PDB/TLD |
| Global | Tenant | Reject operation if updating base document, write as customization if a tenant customization layer is configured |
| Tenant | Global | Reject operation |
| Tenant | Tenant | Write to tenant PDB/TLD |

As should be understood, a tenant 140; 145 can read both global metadata and tenant metadata, for example, to read a tenant level customization and its global base document. When updating a metadata object, if customization layers are configured, MDS would update the customization instead of updating the base document. MDS would check the tenant-scope of the customization instead of the base document in such case. Thus, MDS would allow updating global metadata by a tenant if customizing in a tenant layer.

Figure 2:
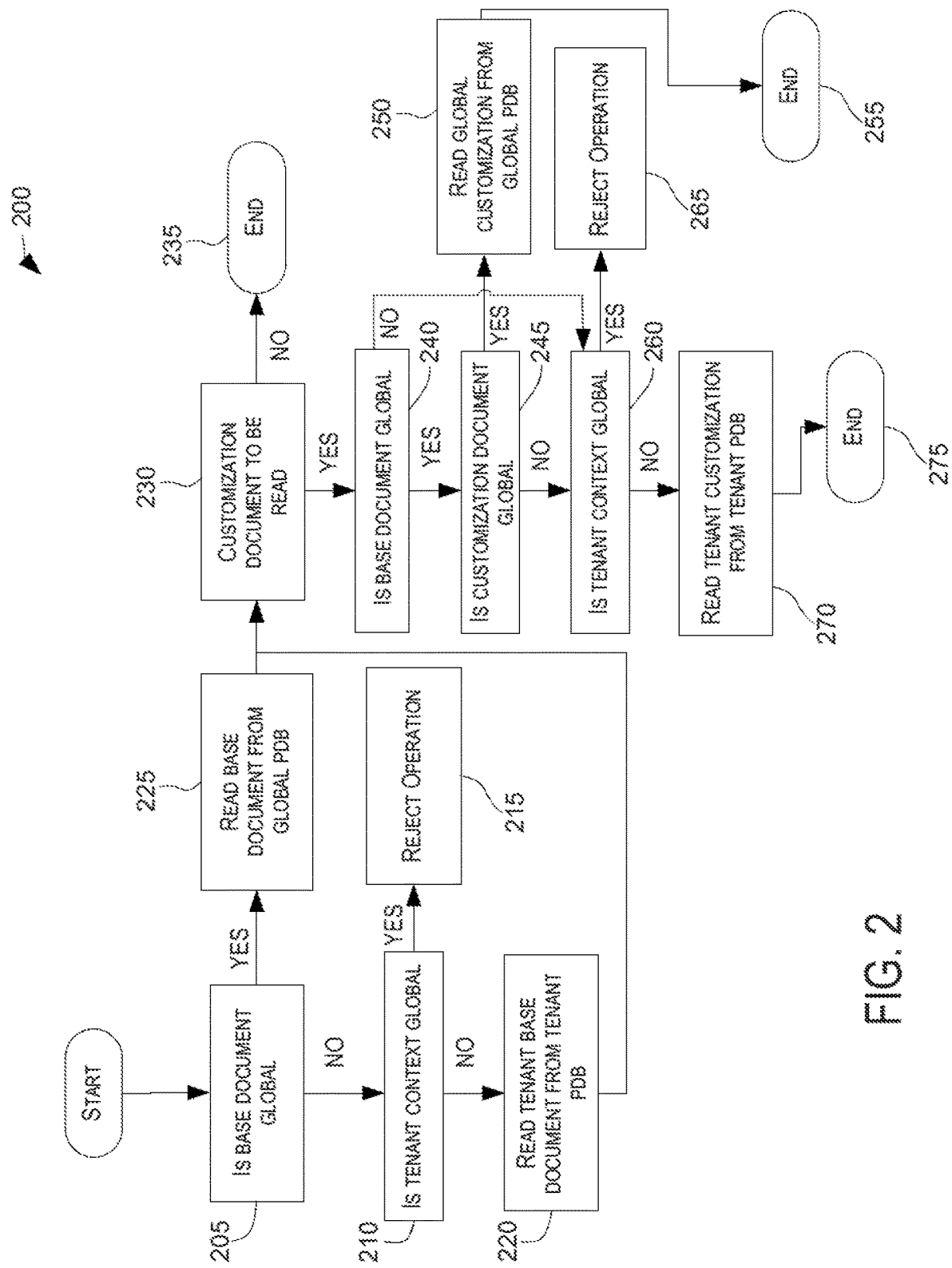
FIG. 2 is a flowchart of a method of reading metadata in accordance with some embodiments.

FIG. 2 is a flowchart 200 illustrating the steps performed in accessing and reading a metadata document in accordance with some embodiments. The processing of flowchart 200 may be implemented in software, hardware, or combinations thereof. As software, flowchart 200 may be implemented as part of a metadata engine configured to provide customized metadata to one or more components of the application (e.g., the graphical user interface, policies, notifications, etc.).

At step 205, a determination is made as to whether a base metadata document requested by a context for access is configured as a global base metadata document. In accordance with some aspects, the base metadata document defines one or more characteristics of at least a portion of an application. As described previously with respect to FIG. 1, these characteristics may correspond to the content, behavior, and/or appearance of the application. In some embodiments, the base metadata document is formatted in XML. However, certain embodiments may be adapted to customize metadata documents formatted in any type of markup language, such as Hyper Text Markup Language (HTML), Standard Generalized Markup Language (SGML), and the like. The determination of whether the base metadata document is configured as a global base metadata document is made by analyzing a namespace of the base document to determine whether the namespace specified in the application configuration is identified as global, for example the configuration example described previously.

At step 210, when the base metadata document is not a global base metadata document (i.e., a tenant base metadata document), a determination is made as to whether the context that submitted the request for the base metadata document is global, for example, a global user or an asynchronous task executing in no specific tenant context. At step 215, when the context that submitted the request is global, the operation is rejected because a global context cannot access or read a tenant base metadata document. At step 220, when the context that submitted the request is not global (e.g., a tenant), a tenant base metadata document is read from the tenant's private storage. At step 225, when the base metadata document is configured as a global base metadata document, the global base metadata document is read from the global database or file storage (both tenant and global context can read from the global database or file storage).

At step 230, a determination is made as to whether a customization document is to be read. For example, any namespace can be mapped to an ordered list of CustomizationClasses in the application configuration or programmatically (e.g., if the application config has a cust-config that has the mapping/mypkg→SiteCC, UserCC then both Site and User customization layers need to be applied). In some embodiments at runtime, MDS will check whether there is a CustomizationClass for the base document being accessed. If so, MDS will then check whether a customization document for that layer exists in the storage (e.g., if base document is /mypkg/page1.xml, then MDS checks whether/mypkg/mdssys/cust/site/site1/page1.xml.xml exists and if so reads it, next it will check if/mypkg/mdssys/cust/user/john/page1.xml.xml exists, if exists, it is read and the delta/customizations are applied on top of "base+site".

At step 235, when there is no customization document to be read, the process ends and only the global or tenant base metadata document is used to process the request (e.g., an application request). At step 240, when there is a customization document to be read and when the base metadata document is a global base metadata document, control passes to step 245. However, when there is a customization document to be read and when the base metadata document is not a global base metadata document (i.e., a tenant base metadata document), control passes to step 260. At step 245, a determination is made as to whether the customization document requested by the context is configured as a global customization document. The determination of whether the customization document is configured as a global customization document is made by analyzing the layer name of the customization document to determine whether the layer name specified in the application configuration is identified as global (i.e., configured layer name), for example the configuration example described previously. At step 250, when the customization document is a global customization document, the global customization document is read from the global database or file storage (both tenant and global context can read from the global database/or file storage). At step 255, the process ends and the global base metadata document and the global customization document are used to process the request (e.g., an application request) by the context.

At step 260, when the customization document is not a global customization document (i.e., a tenant customization document) or when the base metadata document is not a global base metadata document, a determination is made as to whether the context that submitted the request for the base metadata document is global such as a global user. At step 265, when the context that submitted the request is global, the operation is rejected or the customization document is ignored and the global document is accessed or read because a global context cannot access or read a tenant customization document. At step 270, when the context that submitted the request is not global (e.g., a tenant), the tenant customization document is read from the tenant's private storage. At step 275, the process ends and the global or tenant base metadata document and the tenant customization document are used to process the request (e.g., an application request).

Figure 3:
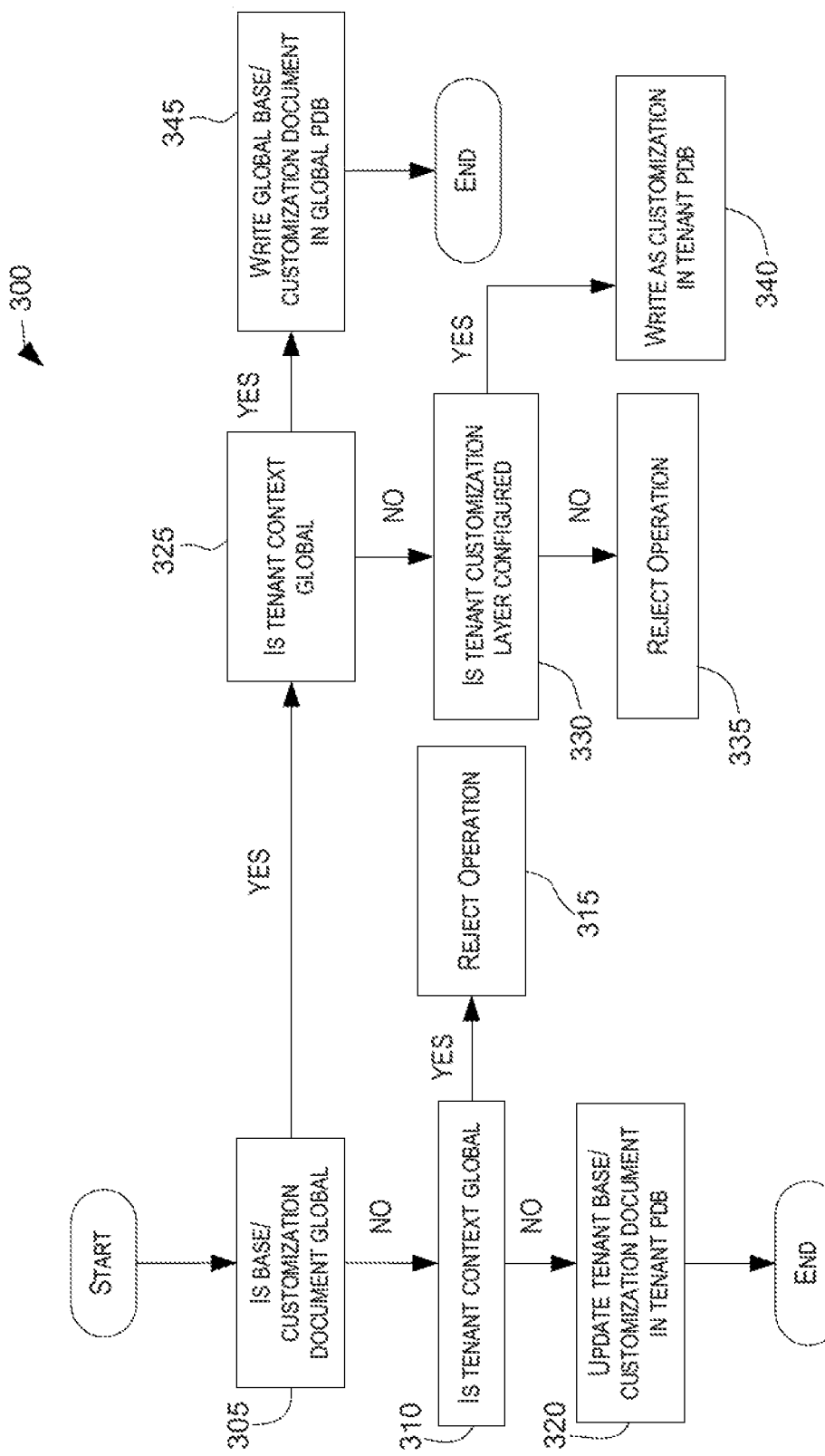
FIG. 3 is a flowchart of a method of writing metadata in accordance with some embodiments.

FIG. 3 is a flowchart 300 illustrating the steps performed in accessing and writing (e.g., create/save/delete/rename) a metadata document in accordance with some embodiments. In various embodiments, the processing of flowchart 300 may be implemented in software, hardware, or combinations thereof. As software, flowchart 300 may be implemented as part of a metadata engine configured to provide customized metadata to one or more components of the application (e.g., the graphical user interface, policies, notifications, etc.).

At step 305, a determination is made as to whether a base metadata or customization document requested by a context for access is configured as a global base metadata or customization document. In accordance with some aspects, the base metadata or customization document defines one or more characteristics of at least a portion of an application. As described previously with respect to FIG. 1, these characteristics may correspond to the content, behavior, and/or appearance of the application. In some embodiments, the base metadata or customization document is formatted in XML. However, certain embodiments may be adapted to customize metadata documents formatted in any type of markup language, such as HTML, SGML, and the like. The determination of whether the base metadata or customization document is configured as a global base metadata or customization document is made by analyzing a namespace or layer name of the base metadata or customization document to determine whether the namespace or layer name specified in the application configuration is identified as global (i.e., configured namespaces or layer name), for example the configuration example described previously.

At step 310, when the base metadata or customization document is not a global base metadata or customization document (i.e., a tenant base metadata or customization document), a determination is made as to whether the context that submitted the request for the base metadata or customization document is global, for example, a global user. At step 315, when the context that submitted the request is global, the operation is rejected because a global context cannot write a tenant base metadata or customization document. At step 320, when the context that submitted the request is not global (e.g., a tenant), the tenant base metadata or customization document is written (e.g., created/saved/deleted/renamed) and stored in the tenant's private storage.

At step 325, when the base metadata or customization document is configured as a global base metadata or customization document, a determination is made as to whether the context that submitted the request for the base metadata or customization document is global, for example, a global user. At step 330, when the context that submitted the request is not global (e.g., a tenant) and a tenant customization layer is not configured, control passes to step 335. However, when the context that submitted the request is not global (e.g., a tenant) and a tenant customization layer is configured, then control passes to step 340. At step 335, the operation is rejected because a tenant cannot modify a global base metadata document. At step 340, the operation (e.g., update or write) may proceed because a tenant context can customize a global base document in a tenant customization layer. At step 345, when the context that submitted the request is global, the global base metadata or customization document is written (e.g., created/saved/deleted/renamed) and stored in the global database or file storage.

Accordingly, since global metadata is common to all tenants, it is not allowed to be updated by any tenant. In certain embodiments, the systems and methods described herein such as the MDS only allow access to the metadata (especially in the instance of a database repository) through APIs. Hence, the MDS will enforce the reading and writing rules by validating the tenant scope against current tenant context and disallowing a tenant from updating any global metadata in all the relevant APIs, as described with respect to FIG. 3.

In alternative embodiments, another solution is to enforce the reading and writing rules based on tenant scope of the document and tenant context at the database level by utilizing a virtual private database (VPD). For example, a VPD policy may be configured for insert/update/delete operations on all MDS database tables when creating MDS database schema for a global database such as a standalone database or a PDB. MDS APIs will set the current tenant-id as a context parameter using OracleConnection. setApplicationContext( ) Oracle JDBC API. The PL/SQL VPD policy procedure will add a predicate that checks if tenant-id is global. The VPD policy procedure that resides in the global database will have a predicate that checks if the tenant-id value set as application context parameter is global. This VPD policy, installed only on the global database, will ensure no data in MDS tables of global database will get updated if attempted from a non-global tenant context. In some embodiments, similar implementation is possible to enforce preventing a global user from reading tenant scoped metadata.

In exemplary embodiments, the tenant base metadata document and the global base metadata document are stored in separate databases (in the case of a multitenant container database (CDB) using a separate pluggable database for global and each tenant), or in separate directories, which can be on different file systems (in the case of a file-based repository using a separate top level directory for global and each tenant). This allows the tenant base metadata document to be isolated from other tenants in a multi-tenant system while also allowing for the tuning of the storage and security options/characteristics as needed for each tenant. This also allows the global base metadata document to be shared across all tenants in a multi-tenant system while also allowing for the global base metadata document to be modified by using tenant customization layers without affecting other tenants that are using the global base metadata document.

In some embodiments, the tenant customization document and the global customization document are stored in separate databases (in the case of a multitenant container database (CDB) using a separate pluggable database for global and each tenant), or in separate directories, which can be on different file systems (in the case of a file-based repository using a separate top level directory for global and each tenant). This allows the tenant customization document to be isolated from other tenants in a multi-tenant system. This also allows the global customization document to be shared across all tenants in a multi-tenant system while also allowing for the global base metadata document to be modified by using tenant customization layers without affecting other tenants that are using the global base metadata document.

In further embodiments, the tenant or global customization document is stored in a predetermined location relative to the location of the base metadata document. For example, a global customization document is stored with the global base metadata document in one PDB and the tenant customization document is stored with the tenant base metadata document in another PDB. Alternatively, a global customization document is stored with the global base metadata document in a file folder located at a first predetermined hierarchical location and the tenant customization document is stored with the tenant base metadata document in a file folder located at a second predetermined hierarchical location. Is some embodiments, a global base metadata document is stored in a global PDB or file folder, and tenant customizations of the global base metadata document are stored in a tenant PDB or file folder.

Figure 4:
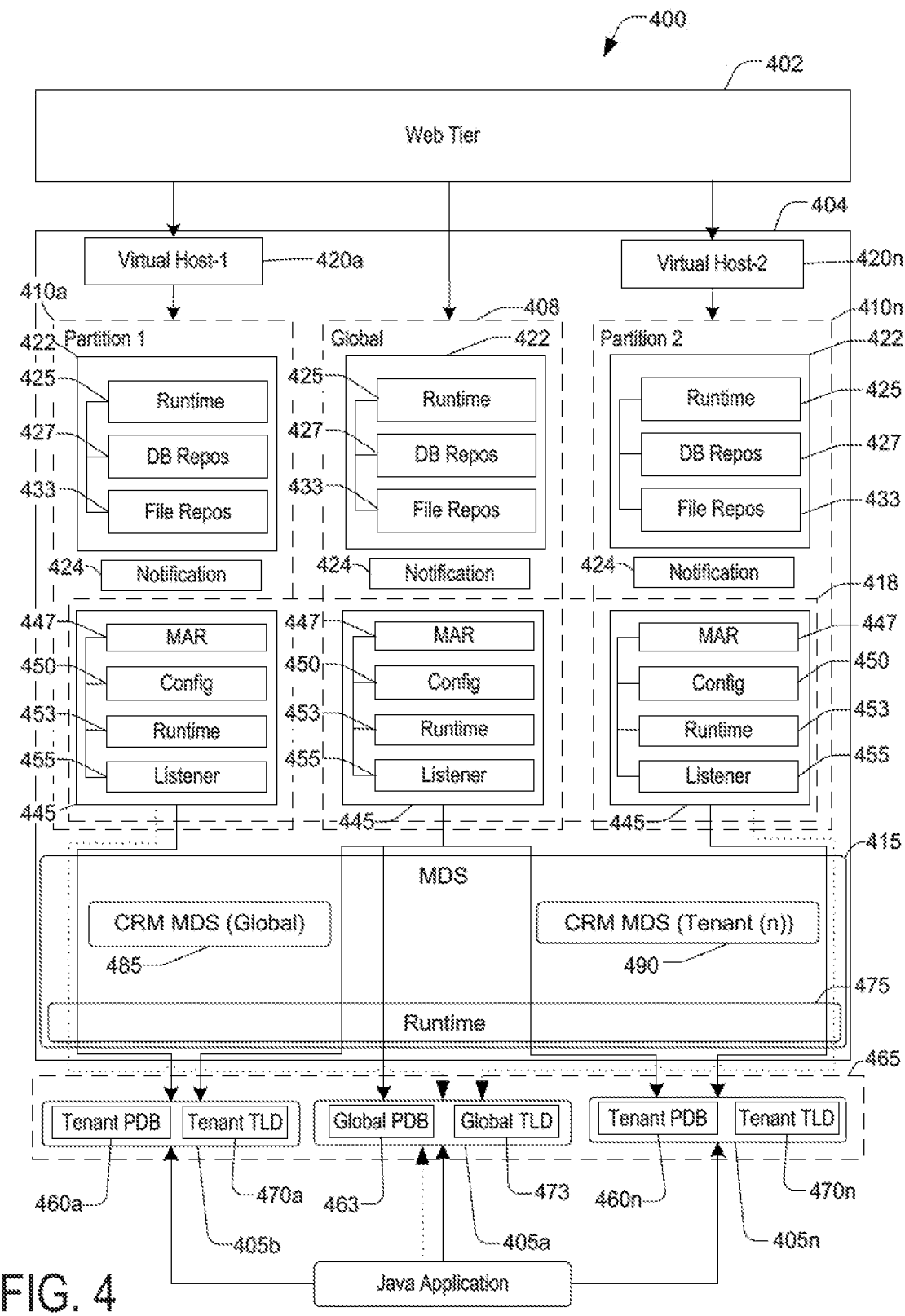
FIG. 4 illustrates a multi-tenant system in accordance with some embodiments.

FIG. 4 is a detailed illustration of a multi-tenant environment for segregating and accessing global and tenant metadata, in accordance with some exemplary embodiments. As shown in FIG. 4, the multi-tenant environment 400 includes web tier 402, a server container 404, and repositories 405a-405n. Web tier 402 is, for example, a load balancer. The web tier 402 can use, for example, an Oracle HTTP Server (OHS).

Server container 404 can include a global or domain partition 408, partitions 410a-410n, and MDS 415. The server container 404 can be, for example, a WebLogic Server (WLS) container. A shared application 418, such as Customer Relationship Management (CRM) can be run in the server container 404. Virtual hosts 420a-420n can communicate with partitions 410a-410n, respectively. Specifically, the server container 404 can expose virtual hosts 420a-420n to the web tier 402. Therefore, if requests are received, the requests can be routed by virtual hosts 420a-420n to the appropriate partition. Requests can be routed to the correct partition based on, for example, a uniform resource locator (URL).

Global or domain partition 408 and each of partitions 410a-410n can include a server 422, for example a Managed Bean (MBean) server, and notification tasks 424, such as CRM MDS notification tasks. The server 422 may comprise a set of MBeans configured to create, monitor, and manage resources. The set of MBeans may include a MDSDomain Runtime MBean 425 used to manage a database-based repository 427 such as in the implementation of PDBs or to manage a file-based repository 433 such as in the implementation of TLDs. Notification tasks 424 are configured to automate the notification of events regarding for the shared application 418.

Global or domain partition 408 and each of partitions 410a-410n can also include an application server 445 upon which the shared application 418 is running. In some embodiments, a metadata archive (MAR) 447, an application config MBean 450, an application runtime MBean 453, and a change listener 455 are running in the shared application 418 on the application server 445. Metadata archive 447 is a compressed archive of selected metadata for the shared application 418. The application config Mbean 450 provides create, read, update, and delete (CRUD) operations that apply to the configuration of the shared application 418. The application runtime MBean 453 is used to access runtime information about the server 445 and its resources. The change listener 455 defines an object configured to listen for change events.

The repositories 405a-405n can include one or more databases such as databases 460a-460n and global database 463. Databases 460a-460n and global database 463 can be, for example, PDBs. Databases 460a-460n and global database 463 can be logically separate databases but they can be administered as part of a single container repository 465. Further, any database structure can be used in addition to or alternative to the databases shown in FIG. 4.

In other embodiments, the repositories 405a-405n can include additionally or alternatively one or more file systems such as file systems 470a-470n and global file system 473. File systems 470a-470n and file system 473 can be, for example, TLDs. File systems 470a-470n and file system 473 can be logically separate file systems. Further, any file system structure can be used in addition to or alternative to the file system shown in FIG. 4.

As shown in FIG. 4, there is a separate PDB or TLD for global or domain partition 408 and each of partitions 410a-410n. For example, global or domain partition 408 can be associated with database 463 or file system 473, partition 410a can be associated with database 460a or file system 470a, partition 410n can be associated with database 460n or file system 470n, etc. Accordingly, metadata can be customized for each tenant and stored separately for each tenant in their respective database or file system. Tenant metadata of shared application 418 for a first tenant can be stored in database 460a or file system 470a which corresponds to the partition 410a of the first tenant. Tenant metadata of shared application 418 for a second tenant can be stored in database 460n or file system 470n which corresponds to the partition 410n of the second tenant. Global metadata of shared application 418 shared across all tenants can be stored in global database 463 or file system 473. The metadata stored in databases 460a-460n or file systems 470a-470n of the tenants can include for example, metadata regarding customizations of a global document and/or metadata regarding a tenant document which is only for the particular tenant. Therefore, customized or tenant metadata can be isolated within each tenant and global metadata can be shared across tenants.

MDS 415 can be configured for storing the metadata (global or tenant metadata). In the repository 405a global metadata is provisioned during system initialization and repositories 405b-405n provisioned for each tenant as a tenant is on-boarded. Based on the tenant context the shared application 418 is executing, metadata is accessed from corresponding storage, i.e., databases 460a-460n and global database 463. MDS can be configured to use either file based or database based storage options. Tenant isolation and sharing can be transparently supported by abstracting the persistence details from public APIs. Tenant and shared metadata can be persisted in global and tenant PDBs for tenant provisioning and management. Additionally, a specialized security mechanism such as VPD policies can be optionally used to enforce tenant isolation. At the same time, regular databases or database products from any vendor (i.e., non-PDBs) can also be supported either using a separate database per tenant or separate schema per tenant.

MDS 415 can include MDS Runtime 475, CRM MDS (Global) 485, and CRM MDS (Tenant (n)) 490, which are configured to provide the services and processes for storing metadata in a database. For example, MDS 415 can be used as a service for datasource configuration, tenant scope evaluation, and the storage and management of metadata in databases 460a-460n and 463. In case of database storage, specialized datasource setup (discussed below in detail with respect to FIG. 5) is used to ensure only tenant's own database is accessible to the tenant (tenant isolation), and a common datasource is shared across all tenants to minimize a number of database connections opened. In the case of tenant scope evaluation, combinations of current tenant context, type of the resource being accessed, operation(s) being performed can be evaluated to determine whether the operation(s) should be allowed and where the metadata should be accessed from. As such, metadata access rules can be enforced such as a tenant can read global metadata from global storage but cannot update the same. If a tenant customization layer is active, it allows a tenant to customize the global metadata and directs the changes to be persisted in tenant's private storage. The server container 404 can use the MDS metadata subsystem's layered customization support to keep tenant customizations separate from the global document. The MDS framework allows a user to create customizable applications by assembling the metadata documents stored in the databases 460a-460n and 463.

In certain embodiments, file systems 470a-470n and 473 may or may not be present within the multi-tenant environment 400. However, in embodiments in which the file systems 470a-470n and 473 are implemented, the MDS 415 may support multi-tenancy by allowing a separate top level directory for global and each tenant. Since the global and tenant directories need not be under same root directory, it is possible to configure network file system mounted directories that are on dedicated a file system for each tenant.

Accordingly, MDS 415 will store global and each tenant's metadata in a separate PDB and/or TLD and use a separate PDB and/or TLD to store global metadata to achieve complete tenant isolation. When the system is deployed, the global PDB and/or TLD will be automatically provisioned and an MDS database schema created using a repository creation utility (RCU) if using database storage. As new tenants are onboarded, a provisioning system will allocate and configure a new PDB and/or TLD to the tenant and orchestrate creating all required database schema including for MDS 415 if using database storage. When a tenant is deprovisioned, a corresponding PDB will be dropped and/or TLD deleted, removing all the data and metadata of that tenant.

Each PDB is accessed using its own ServiceName such that each PDB works like a separate database. Hence, in certain embodiments, a separate datasource is needed for accessing each tenant's PDB and global PDB. (e.g., it is not possible to use a single datasource and switch the java database connectivity connection to point to different tenant stripes unlike in a virtual private database (VPD)). In certain embodiments, the following may be considered while designing the datasource configuration: (i) the number of datasources needed is minimized since each datasource might keep a minimum number of physical connections, consuming precious database resources, (ii) tenants can be provisioned/deprovisioned dynamically and hence the tenant to datasource mapping cannot be configured upfront in the application config during deployment, and (iii) it is made possible to ensure metadata in global PDB is not updated by any tenants (i.e, global PDB should be read-only in tenant-context) and a global user cannot modify metadata in any tenant PDB.

Figure 5:
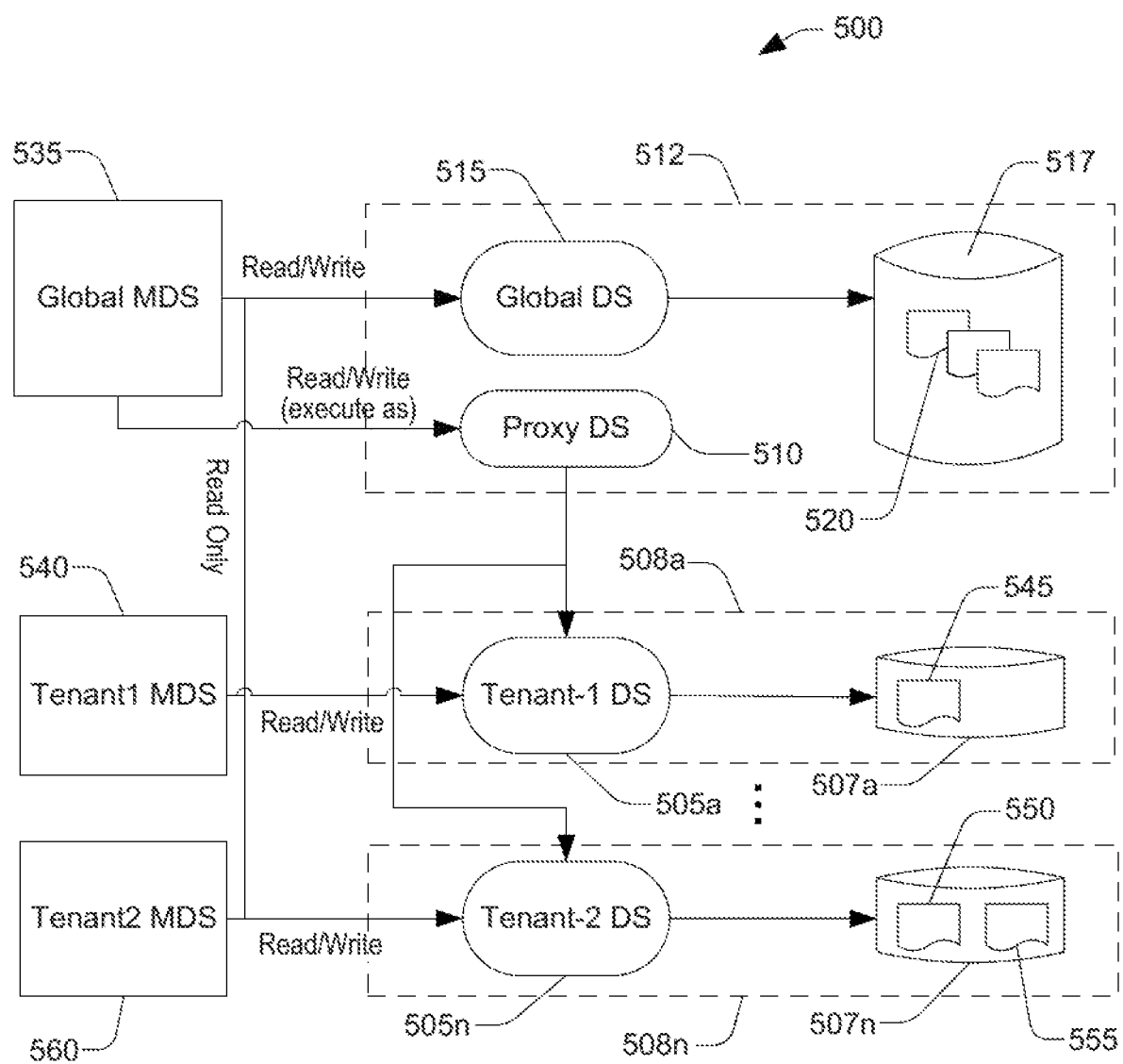
FIG. 5 illustrates datasource setup and utilization in accordance with some embodiments.

FIG. 5 illustrates a datasource setup 500 that may be configured in accordance with some embodiments when using a server container with partition features such as Weblogic Application Server (WLS). As shown in FIG. 5, a tenant datasource 505a-505n is created at each WLS partition 508a-508n and configured pointing to a corresponding tenant PDB 507a-507n with a java naming and directory interface (JNDI) name that is the same as configured by app. Since WLS supports a separate JNDI tree for each WLS partition 508a-508n, even though the same JNDI name is used, a correct tenant datasource 505a-505n will be retrieved based on the current tenant context.

A DataSourceProxy 510 is created at the WLS server or domain level 512 and configured to communicate with tenant datasource 505a-505n. DataSourceProxy 510 is configured to delegate to the appropriate datasource 505a-505n based on whether the context is global or tenant. For example, the DataSourceProxy 510 is used if a task scheduled (e.g., MDS polling) in the global context needs to perform some operation on a tenant PDB 507a-507n.

A global datasource 515 is created at the WLS server or domain level 512 pointing to the global PDB 517. The global datasource 515 will be used for read-only operations on global PDB 517 by tenants and for read/write operations on global PDB 517 by a global user. The global datasource 515 is defined at the WLS server or domain level 512. The global datasource 515 is shared by all tenants. This saves database resources compared to having the global datasource 515 in each WLS partition 508a-508n. Tenant metadata is stored in its own PDB 507a-507n and accessed through a corresponding dedicated tenant datasource 505a-505n. Since the database credentials are configured at datasource level, it ensures tenant isolation since each tenant will not have access to the datasource configuration of other tenants. Performance parameters can be tuned for individual tenants if needed. For example, changing connection pool size for the tenant datasource 505a-505n or tuning performance of a PDB using a Resource Manager.

As shown in FIG. 5, the global datasource 515 may be configured to access one or more global documents 520 in the global PDB 517. The global documents 520 can include global metadata that is stored centrally in the global PDB 517. The global documents 520 may be deployed in a global runtime. One or more of the global documents 520 can act as a base document or template which can be modified by a tenant. If a global user of, for example, a server container (e.g., server container 404 described above with respect to FIG. 4) would like to access one or more of the global documents 520, the global data source 515 would be accessed with read/write permissions via Global MDS 535 (e.g., CRM MDS (Global) 485 discussed with respect to FIG. 4) by the processes of the global user during design or runtime of the server container. The global data source 515 allows accessing the one or more global documents 520 stored in the global PDB 517. The one or more global documents 520 which have not been modified or which act as a base document for customization would be accessed in the global PDB 517.

If the tenant of, for example, WLS partition 508a would like to access the one or more of the global documents 520 without making any customizations, the global data source 515 would be accessed with read only permissions via Tenant(1) MDS 540 (e.g., CRM MDS (Tenant(n)) 490 discussed with respect to FIG. 4) by the processes of the tenant during runtime of the server container. The global data source 515 references the one or more global documents 520 stored in the global PDB 517. The one or more global documents 520 which have not been modified or which act as a base document for customization would be accessed in the global PDB 517. Therefore, the one or more global documents 520 are not being stored multiple times in multiple tenant repositories.

Tenant datasource 505*a*-505*n* may be configured to reference one or more customized documents 545 and 550 in a corresponding tenant PDB 507*a*-507*n*. For example, each WLS partition (e.g., 508*a*) can be completely isolated from the other WLS paritions (e.g., WLS 508*b*-508*n*). If the tenant of, for example, WLS partition 508*a* would like to use one or more of the global documents 520, but the tenant would like to modify the metadata of the one or more global documents 520, then the tenant of WLS partition 508*a* can customize the one or more global documents 520. For example, the global data source 515 would be accessed with read only permissions via Tenant(1) MDSInstance 540 (e.g., CRM MDSInstance (Tenant(n)) 490 discussed with respect to FIG. 4) by the processes of the tenant during runtime of the server container. The global data source 515 references the one or more global documents 520 stored in the global PDB 517. The tenant of WLS partition 508*a* can then customize the one or more global documents 520 to create the one or more customized documents 545 for that tenant. The customizations to the one or more global documents 520 can then be stored in tenant PDB 507*a* of partition 525 belonging to the tenant. That is, the customized documents 545 that the tenant has made from the one or more global documents 520 can be written/stored in tenant PDB 507*a* belonging to that tenant, and accessed using tenant datasource 505*a*.

If a global context, for example MDS change polling query, would like to access the customized documents 545 as a tenant corresponding to WLS partition 508*a*, the tenant data source 505*a* would be accessed with read/write (execute as) permissions via Global MDS 535 (e.g., CRM MDS (Global) 485 discussed with respect to FIG. 4) and DataSourceProxy 510 by the processes of the tenant during runtime of the server container. DataSourceProxy 510 would then delegate to the right tenant datasource, i.e., tenant data source 505*a*, based on the tenant context (e.g., the tenant context would have been temporarily changed to Tenant1 by the change polling query). The tenant data source 505*a* references the customized documents 545 stored in the tenant PDB 507*a*. The customized documents 545 would be accessed from the tenant PDB 507*a*. Therefore, the customized documents 545 are accessible by global when executing an operation on-behalf of a tenant (e.g., executeAs).

If the tenant of, for example, WLS partition 508*a* would like to access the customized documents 545, the tenant data source 505*a* would be accessed with read/write permissions via Tenant(1) MDS 540 (e.g., CRM MDS (Tenant(n)) 490 discussed with respect to FIG. 4) by the processes of the tenant during runtime of the server container. The tenant data source 505*a* references the customized documents 545 stored in the tenant PDB 507*a*. The customized documents 545 would be accessed in the tenant PDB 507*a*. Therefore, the customized documents 545 are not accessible by any other tenant or a global user.

The datasource 505*n* may also be configured to access one or more tenant documents in tenant PDB 507*n*. For example, tenant documents 555 can include tenant metadata that is stored in tenant PDB 507*n*. The tenant documents 555 include metadata specific for the tenant in WLS partition 508*n*. The tenant documents 555 would not be used by the tenants in any other partitions such as partition 508*a*. The tenant documents 555 are specific to and authored by the tenant, and include documents that only the particular tenant can access and are not in the global PDB 517. For example, an application directed to XSL transformation (XSLT) can be authored completely by a tenant.

If the tenant of, for example, WLS partition 508*n* would like to access the tenant documents 555, the tenant data source 505*n* would be accessed with read/write permissions via Tenant(2) MDS (e.g., CRM MDS (Tenant(n)) 490 discussed with respect to FIG. 4) by the processes of the tenant during runtime of the server container. The tenant data source 505*n* references the tenant documents 555 stored in the tenant PDB 507*n*. The tenant documents 555 would be accessed in the tenant PDB 507*n*. Therefore, the tenant documents 555 are not accessible by any other tenant or a global user.

When the tenant of any of the partitions executes a process during runtime of the server container, the metadata documents referenced in the corresponding tenant PDB would be used in conjunction with the base documents, if any, referenced in the global PDB to perform the process. For example, when the tenant of WLS partition 508*a* or 508*n* executes a process, such as, during runtime of the server container 404, the metadata documents (e.g., customized document 545 and 550, or tenant documents 555) referenced in tenant PDB 507*a* or PDB 507*n* would be used in conjunction with the base documents (e.g., one or more global documents 520), if any, referenced in the global PDB 517 to perform the process.

The exemplary embodiments herein have been described with respect to two tenants, datasources, and partitions in a server container, however, more than two tenants, datasources, and partitions can be included in the server container. Further, a tenant can have more than one partition. Also, a tenant can have more than one database and/or file system.

Figure 6:
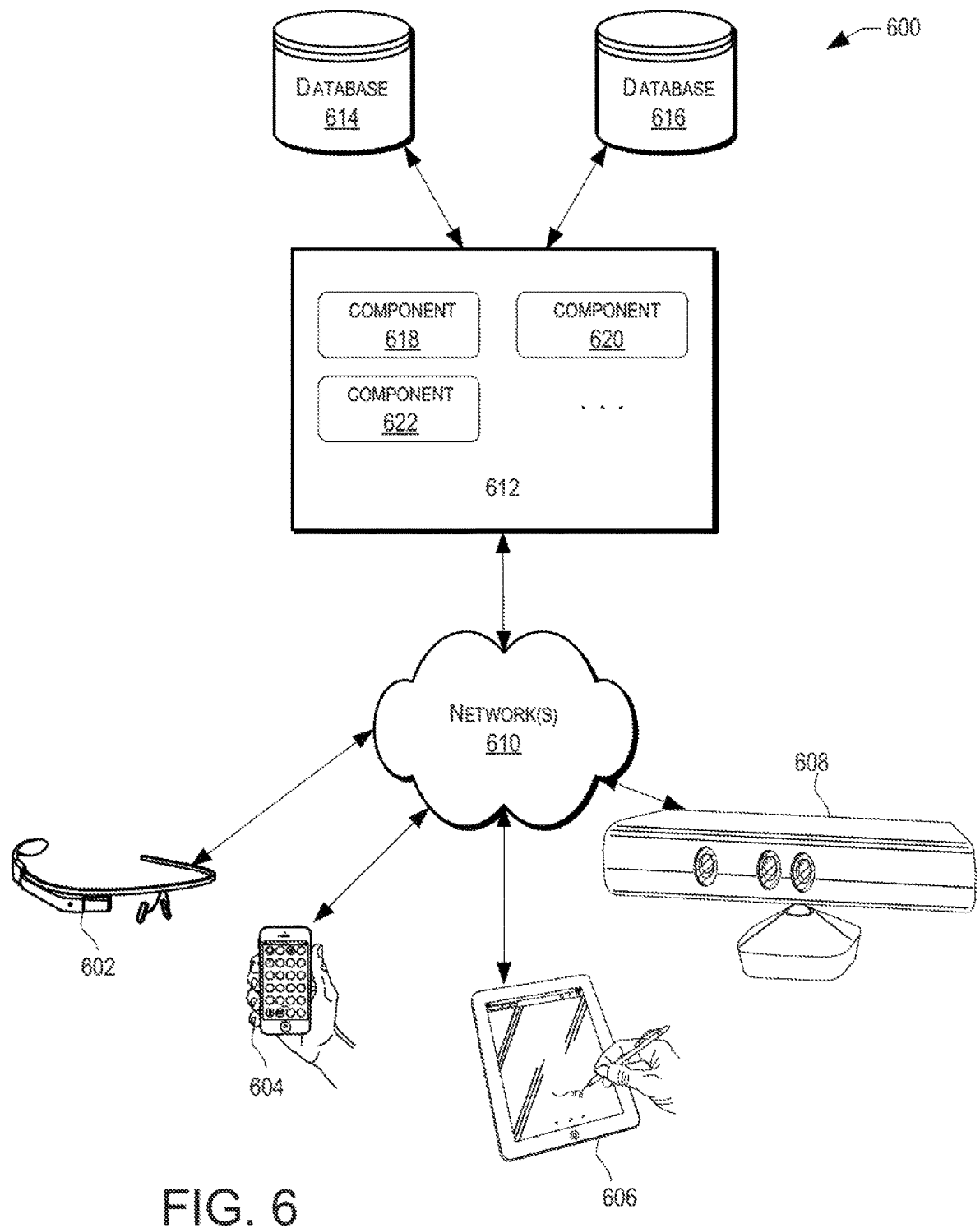
FIG. 6 illustrates a simplified diagram of a distributed system in accordance with some embodiments.

FIG. 6 illustrates a simplified diagram of a distributed system 600 for implementing an exemplary embodiment. In the illustrated exemplary embodiment, the distributed system 600 includes one or more client computing devices 602, 604, 606, and 608, which are configured to execute and operate a client application such as a web browser, proprietary client, or the like over one or more network(s) 610. The server 612 may be communicatively coupled with the remote client computing devices 602, 604, 606, and 608 via network 610.

In various embodiments, the server 612 may be adapted to run one or more services or software applications such as services and applications that provide message delivery services. In certain embodiments, the server 612 may also provide other services or software applications can include non-virtual and virtual environments. In some embodiments, these services may be offered as web-based or cloud services or under a Software as a Service (SaaS) model to the users of the client computing devices 602, 604, 606, and/or 608. Users operating the client computing devices 602, 604, 606, and/or 608 may in turn utilize one or more client applications to interact with the server 612 to utilize the services provided by these components.

In the configuration depicted in FIG. 6, the software components 618, 620 and 622 of system 600 are shown as being implemented on the server 612. In other embodiments, one or more of the components of the system 600 and/or the services provided by these components may also be implemented by one or more of the client computing devices 602, 604, 606, and/or 608. Users operating the client computing devices may then utilize one or more client applications to use the services provided by these components. These components may be implemented in hardware, firmware, software, or combinations thereof. It should be appreciated that various different system configurations are possible, which may be different from distributed system 600. The embodiment shown in FIG. 6 is thus one example of a distributed system for implementing an embodiment system and is not intended to be limiting.

The client computing devices 602, 604, 606, and/or 608 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 610.

Although distributed system 600 in FIG. 6 is shown with four client computing devices, any number of client computing devices may be supported. Other devices, such as devices with sensors, etc., may interact with the server 612.

The network(s) 610 in the distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 612 can include one or more virtual machines running virtual operating systems, or other computing systems involving virtualization. One or more flexible pools of logical storage devices can be virtualized to maintain virtual storage devices for the server. Virtual networks can be controlled by the server 612 using software defined networking. In various embodiments, the server 612 may be adapted to run one or more services or software applications described in the foregoing disclosure. For example, the server 612 may correspond to a server for performing processing as described above according to an embodiment of the present disclosure.

The server 612 may run an operating system including any of those discussed above, as well as any commercially available server operating system. Server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 612 may include one or more applications to analyze and consolidate data feeds and/or event updates received from users of the client computing devices 602, 604, 606, and 608. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 612 may also include one or more applications to display the data feeds and/or real-time events via one or more display devices of the client computing devices 602, 604, 606, and 608.

The distributed system 600 may also include one or more databases 614 and 616. These databases may provide a mechanism for storing information such as metadata, and other information used by certain embodiments. Databases 614 and 616 may reside in a variety of locations. By way of example, one or more of databases 614 and 616 may reside on a non-transitory storage medium local to (and/or resident in) the server 612. Alternatively, the databases 614 and 616 may be remote from the server 612 and in communication with the server 612 via a network-based or dedicated connection. In one set of embodiments, the databases 614 and 616 may reside in a storage-area network (SAN). Similarly, any necessary files for performing the functions attributed to the server 612 may be stored locally on the server 612 and/or remotely, as appropriate. In one set of embodiments, the databases 614 and 616 may include relational databases, such as databases provided by Oracle, that are adapted to store, update, and retrieve data in response to SQL-formatted commands.

Figure 7:
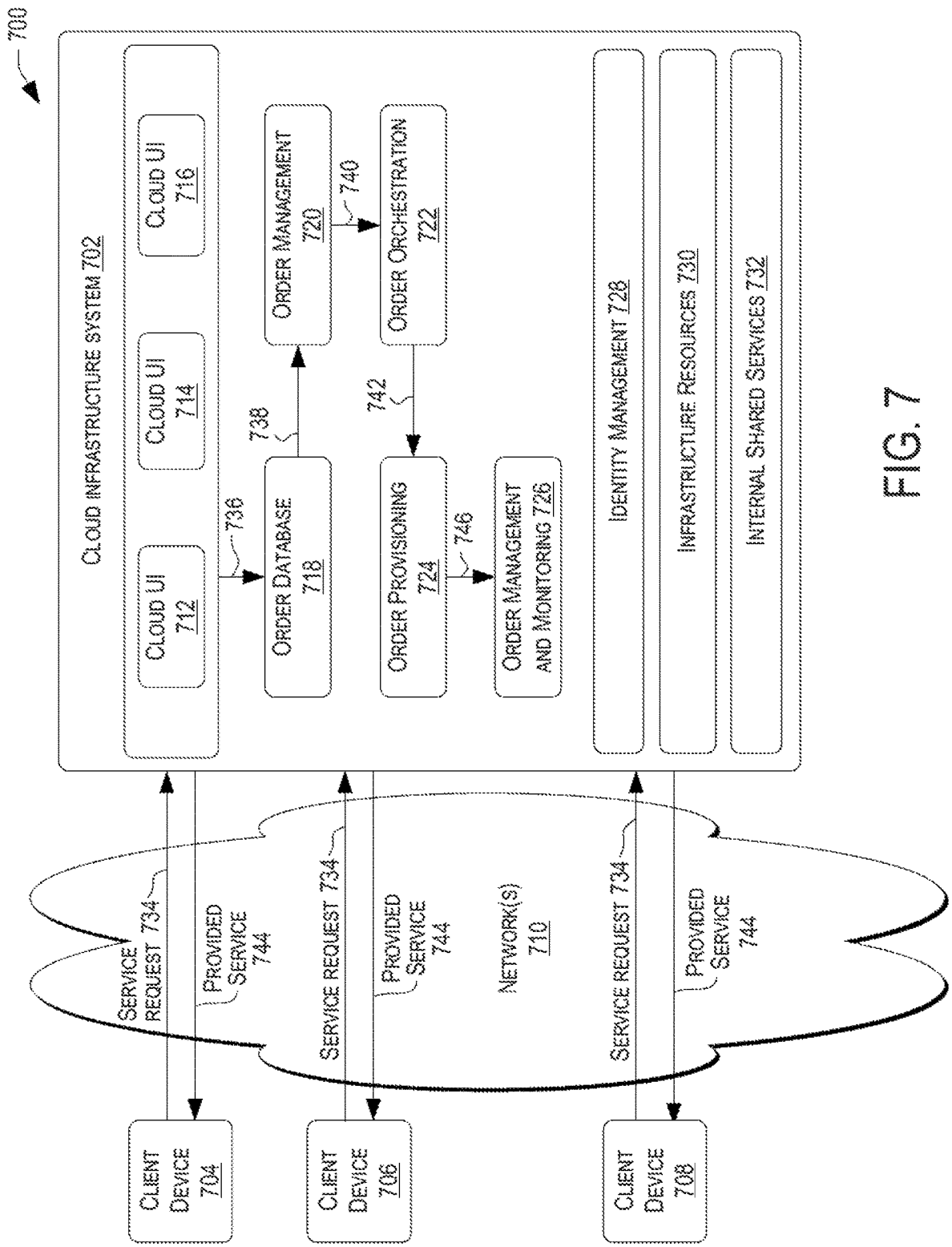
FIG. 7 illustrates a simplified block diagram of one or more elements of a system environment in which services may be offered as cloud services in accordance with some embodiments.

In some embodiments, the message delivery services described above may be offered as services via a cloud environment. FIG. 7 illustrates a simplified block diagram of one or more components of a system environment 700 in which services may be offered as cloud services, in accordance with an embodiment of the present disclosure. In the illustrated embodiment in FIG. 7, system environment 700 includes one or more client computing devices 704, 706, and 708 that may be used by users to interact with a cloud infrastructure system 702 that provides cloud services, including services for dynamically modifying documents (e.g., webpages) responsive to usage patterns. Cloud infrastructure system 702 may comprise one or more computers and/or servers.

It should be appreciated that cloud infrastructure system 702 depicted in FIG. 7 may have other components than those depicted. Further, the embodiment shown in FIG. 7 is only one example of a cloud infrastructure system that may incorporate an embodiment. In some other embodiments, cloud infrastructure system 702 may have more or fewer components than shown in the figure, may combine two or more components, or may have a different configuration or arrangement of components.

Client computing devices 704, 706, and 708 may be devices similar to those described above for 602, 604, 606, and 608. Client computing devices 704, 706, and 708 may be configured to operate a client application such as a web browser, a proprietary client application (e.g., Oracle Forms), or some other application, which may be used by a user of the client computing device to interact with cloud infrastructure system 702 to use services provided by cloud infrastructure system 702. Although exemplary system environment 700 is shown with three client computing devices, any number of client computing devices may be supported. Other devices such as devices with sensors, etc. may interact with cloud infrastructure system 702.

Network(s) 710 may facilitate communications and exchange of data between clients 704, 706, and 708 and cloud infrastructure system 702. Each network may be any type of network familiar to those skilled in the art that can support data communications using any of a variety of commercially-available protocols, including those described above for network(s) 610.

In certain embodiments, services provided by cloud infrastructure system 702 may include a host of services that are made available to users of the cloud infrastructure system on demand. In addition to services related to account management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 702 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 702 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 702 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a company, government agency, research organization, private individual, group of like-minded individuals or organizations, or other entity.

In various embodiments, cloud infrastructure system 702 may be adapted to automatically provision, manage and track a customer's subscription to services offered by cloud infrastructure system 702. Cloud infrastructure system 702 may provide the cloud services via different deployment models. For example, services may be provided under a public cloud model in which cloud infrastructure system 702 is owned by an organization selling cloud services (e.g., owned by Oracle Corporation) and the services are made available to the general public or different industry enterprises. As another example, services may be provided under a private cloud model in which cloud infrastructure system 702 is operated solely for a single organization and may provide services for one or more entities within the organization. The cloud services may also be provided under a community cloud model in which cloud infrastructure system 702 and the services provided by cloud infrastructure system 702 are shared by several organizations in a related community. The cloud services may also be provided under a hybrid cloud model, which is a combination of two or more different models.

In some embodiments, the services provided by cloud infrastructure system 702 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 702. Cloud infrastructure system 702 then performs processing to provide the services in the customer's subscription order.

In some embodiments, the services provided by cloud infrastructure system 702 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by cloud infrastructure system 702 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 702 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 702 may also include infrastructure resources 730 for providing the resources used to provide various services to customers of the cloud infrastructure system. In one embodiment, infrastructure resources 730 may include pre-integrated and optimized combinations of hardware, such as servers, storage, and networking resources to execute the services provided by the PaaS platform and the SaaS platform, and other resources.

In some embodiments, resources in cloud infrastructure system 702 may be shared by multiple users and dynamically re-allocated per demand. Additionally, resources may be allocated to users in different time zones. For example, cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 732 may be provided that are shared by different components or modules of cloud infrastructure system 702 to enable provision of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 702 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 702, and the like.

In one embodiment, as depicted in FIG. 7, cloud management functionality may be provided by one or more modules, such as an order management module 720, an order orchestration module 722, an order provisioning module 724, an order management and monitoring module 726, and an identity management module 728. These modules may include or be provided using one or more computers and/or servers, which may be general purpose computers, specialized server computers, server farms, server clusters, or any other appropriate arrangement and/or combination.

In an exemplary operation, at 734, a customer using a client device, such as client device 704, 706 or 708, may interact with cloud infrastructure system 702 by requesting one or more services provided by cloud infrastructure system 702 and placing an order for a subscription for one or more services offered by cloud infrastructure system 702. In certain embodiments, the customer may access a cloud User Interface (UI) such as cloud UI 712, cloud UI 714 and/or cloud UI 716 and place a subscription order via these UIs. The order information received by cloud infrastructure system 702 in response to the customer placing an order may include information identifying the customer and one or more services offered by the cloud infrastructure system 702 that the customer intends to subscribe to.

At 736, the order information received from the customer may be stored in an order database 718. If this is a new order, a new record may be created for the order. In one embodiment, order database 718 can be one of several databases operated by cloud infrastructure system 718 and operated in conjunction with other system elements.

At 738, the order information may be forwarded to an order management module 720 that may be configured to perform billing and accounting functions related to the order, such as verifying the order, and upon verification, booking the order.

At 740, information regarding the order may be communicated to an order orchestration module 722 that is configured to orchestrate the provisioning of services and resources for the order placed by the customer. In some instances, order orchestration module 722 may use the services of order provisioning module 724 for the provisioning. In certain embodiments, order orchestration module 722 enables the management of business processes associated with each order and applies business logic to determine whether an order should proceed to provisioning.

As shown in the embodiment depicted in FIG. 7, at 742, upon receiving an order for a new subscription, order orchestration module 722 sends a request to order provisioning module 724 to allocate resources and configure resources needed to fulfill the subscription order. Order provisioning module 724 enables the allocation of resources for the services ordered by the customer. Order provisioning module 724 provides a level of abstraction between the cloud services provided by cloud infrastructure system 700 and the physical implementation layer that is used to provision the resources for providing the requested services. This enables order orchestration module 724 to be isolated from implementation details, such as whether or not services and resources are actually provisioned on the fly or pre-provisioned and only allocated/assigned upon request.

At 744, once the services and resources are provisioned, a notification may be sent to the subscribing customers indicating that the requested service is now ready for use. In some instance, information (e.g. a link) may be sent to the customer that enables the customer to start using the requested services.

At 746, a customer's subscription order may be managed and tracked by an order management and monitoring module 726. In some instances, order management and monitoring module 726 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 700 may include an identity management module 728 that is configured to provide identity services, such as access management and authorization services in cloud infrastructure system 700. In some embodiments, identity management module 728 may control information about customers who wish to utilize the services provided by cloud infrastructure system 702. Such information can include information that authenticates the identities of such customers and information that describes which actions those customers are authorized to perform relative to various system resources (e.g., files, directories, applications, communication ports, memory segments, etc.) Identity management module 728 may also include the management of descriptive information about each customer and about how and by whom that descriptive information can be accessed and modified.

Figure 8:
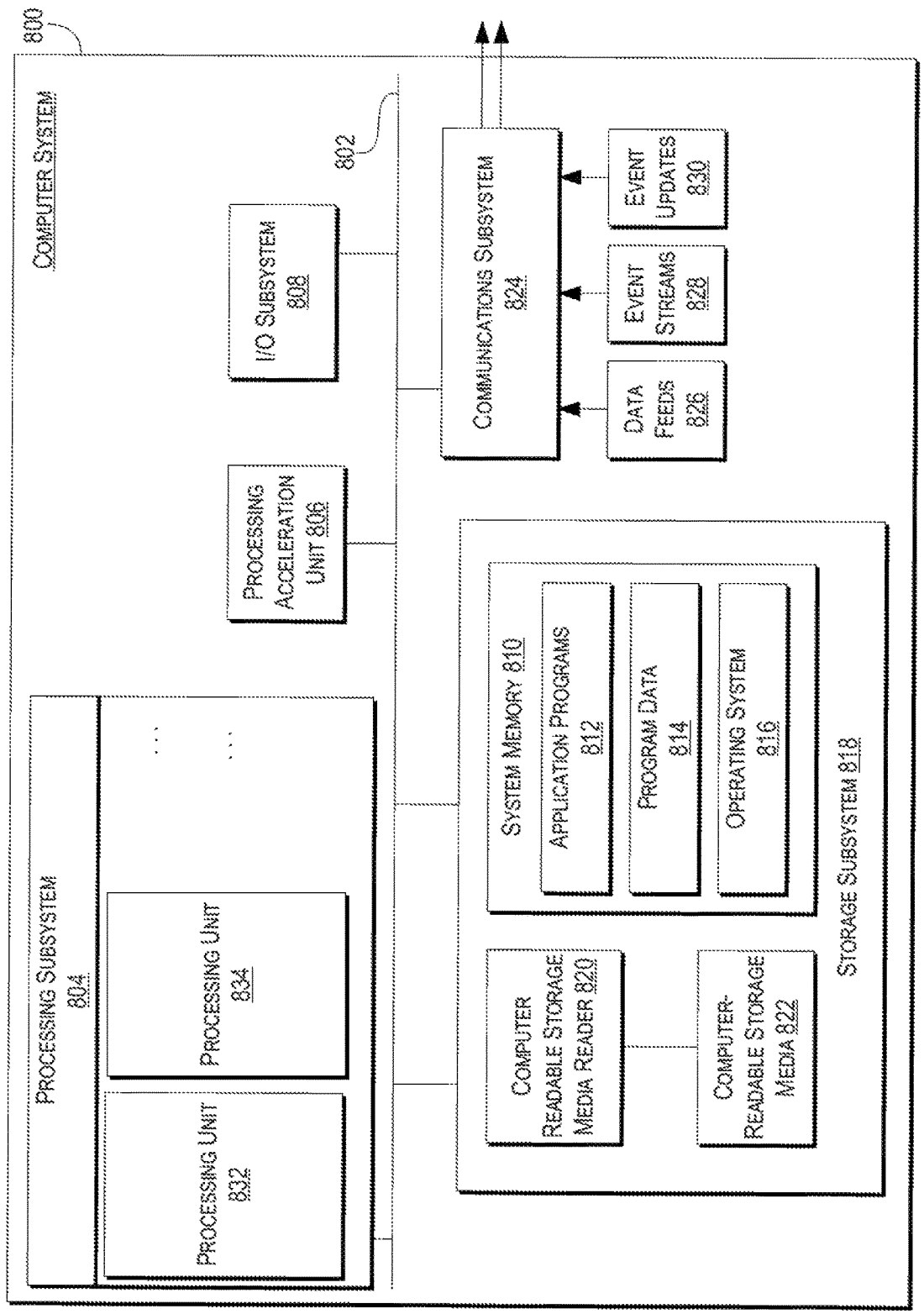
FIG. 8 illustrates an exemplary computer system that may be used to implement certain elements in accordance with some embodiments.

FIG. 8 illustrates an exemplary computer system 800 that may be used to implement an embodiment. In some embodiments, computer system 800 may be used to implement any of the various servers and computer systems described above. As shown in FIG. 8, computer system 800 includes various subsystems including a processing subsystem 804 that communicates with a number of peripheral subsystems via a bus subsystem 802. These peripheral subsystems may include a processing acceleration unit 806, an I/O subsystem 808, a storage subsystem 818 and a communications subsystem 824. Storage subsystem 818 may include tangible computer-readable storage media 822 and a system memory 810.

Bus subsystem 802 provides a mechanism for letting the various components and subsystems of computer system 800 communicate with each other as intended. Although bus subsystem 802 is shown schematically as a single bus, alternative embodiments of the bus subsystem may utilize multiple buses. Bus subsystem 802 may be any of several types of bus structures including a memory bus or memory controller, a peripheral bus, and a local bus using any of a variety of bus architecture. For example, such srchitecture may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 804 controls the operation of computer system 800 and may comprise one or more processing units 832, 834, etc. A processing unit may include one or more processors, including single core or multicore processors, one or more cores of processors, or combinations thereof. In some embodiments, processing subsystem 804 can include one or more special purpose co-processors such as graphics processors, digital signal processors (DSPs), or the like. In some embodiments, some or all of the processing units of processing subsystem 804 can be implemented using customized circuits, such as application specific integrated circuits (ASICs), or field programmable gate arrays (FPGAs).

In some embodiments, the processing units in processing subsystem 804 can execute instructions stored in system memory 810 or on computer readable storage media 822. In various embodiments, the processing units can execute a variety of programs or code instructions and can maintain multiple concurrently executing programs or processes. At any given time, some or all of the program code to be executed can be resident in system memory 810 and/or on computer-readable storage media 810 including potentially on one or more storage devices. Through suitable programming, processing subsystem 804 can provide various functionalities described above for dynamically modifying documents (e.g., webpages) responsive to usage patterns.

In certain embodiments, a processing acceleration unit 806 may be provided for performing customized processing or for off-loading some of the processing performed by processing subsystem 804 so as to accelerate the overall processing performed by computer system 800.

I/O subsystem 808 may include devices and mechanisms for inputting information to computer system 800 and/or for outputting information from or via computer system 800. In general, use of the term "input device" is intended to include all possible types of devices and mechanisms for inputting information to computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 800 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 818 provides a repository or data store for storing information that is used by computer system 800. Storage subsystem 818 provides a tangible non-transitory computer-readable storage medium for storing the basic programming and data constructs that provide the functionality of some embodiments. Software (programs, code modules, instructions) that when executed by processing subsystem 804 provide the functionality described above may be stored in storage subsystem 818. The software may be executed by one or more processing units of processing subsystem 804. Storage subsystem 818 may also provide a repository for storing data used in accordance with some embodiments.

Storage subsystem 818 may include one or more non-transitory memory devices, including volatile and non-volatile memory devices. As shown in FIG. 8, storage subsystem 818 includes a system memory 810 and a computer-readable storage media 822. System memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 800, such as during start-up, may typically be stored in the ROM. The RAM typically contains data and/or program modules that are presently being operated and executed by processing subsystem 804. In some implementations, system memory 810 may include multiple different types of memory, such as static random access memory (SRAM) or dynamic random access memory (DRAM).

By way of example, and not limitation, as depicted in FIG. 8, system memory 810 may store application programs 812, which may include client applications, Web browsers, mid-tier applications, relational database management systems (RDBMS), etc., program data 814, and an operating system 816. By way of example, operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 822 may store programming and data constructs that provide the functionality of some embodiments. Software (programs, code modules, instructions) that when executed by processing subsystem 804 a processor provide the functionality described above may be stored in storage subsystem 818. By way of example, computer-readable storage media 822 may include non-volatile memory such as a hard disk drive, a magnetic disk drive, an optical disk drive such as a CD ROM, DVD, a Blu-Ray® disk, or other optical media. Computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 822 may provide storage of computer-readable instructions, data structures, program modules, and other data for computer system 800.

In certain embodiments, storage subsystem 818 may also include a computer-readable storage media reader 820 that can further be connected to computer-readable storage media 822. Together and, optionally, in combination with system memory 810, computer-readable storage media 822 may comprehensively represent remote, local, fixed, and/or removable storage devices plus storage media for storing computer-readable information.

In certain embodiments, computer system 800 may provide support for executing one or more virtual machines. Computer system 800 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 800. Accordingly, multiple operating systems may potentially be run concurrently by computer system 800. Each virtual machine generally runs independently of the other virtual machines.

Communications subsystem 824 provides an interface to other computer systems and networks. Communications subsystem 824 serves as an interface for receiving data from and transmitting data to other systems from computer system 800. For example, communications subsystem 824 may enable computer system 800 to establish a communication channel to one or more client devices via the Internet for receiving and sending information from and to the client devices.

Communication subsystem 824 may support both wired and/or wireless communication protocols. For example, in certain embodiments, communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 824 can provide wired network connectivity (e.g., Ethernet) in addition to or instead of a wireless interface.

Communication subsystem 824 can receive and transmit data in various forms. For example, in some embodiments, communications subsystem 824 may receive input communication in the form of structured and/or unstructured data feeds 826, event streams 828, event updates 830, and the like. For example, communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 824 may also be configured to output the structured and/or unstructured data feeds 826, event streams 828, event updates 830, and the like to one or more databases that may be in communication with one or more streaming data source computers coupled to computer system 800.

Computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of this disclosure. Some embodiments are not restricted to operation within certain specific data processing environments, but are free to operate within a plurality of data processing environments. Additionally, although some embodiments have been described using a particular series of transactions and steps, it should be apparent to those skilled in the art that the scope of the present invention is not limited to the described series of transactions and steps. Various features and aspects of the above-described embodiments may be used individually or jointly.

Further, while some embodiments have been described using a particular combination of hardware and software, it should be recognized that other combinations of hardware and software are also within the scope of the present invention. Certain embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:
   determining, by a computing system, whether a base document or a customization document to be accessed is a global document, wherein the determining, whether the base document to be accessed is the global document, includes analyzing a namespace of the base document to determine whether the namespace is identified as global;
   when the base document is the global document, accessing, by the computing system, the base document from a global repository shared amongst tenants of a multi-tenant system; and
   when the base document is not the global document, accessing, by the computing system, the base document from a tenant repository that is accessible by a tenant of the multi-tenant system, wherein the tenant repository is isolated from other tenants of the multi-tenant system;
   determining, by the computing system, whether a context requesting access to the base document or the customization document is global;
   when (i) the base document or the customization document to be accessed is the global document, and (ii) the context requesting access to the base document or the customization document is global, writing, by the computing system, the base document or the customization document in the global repository;
   when (i) the base document or the customization document is not the global document, and (ii) the context requesting access to the base document or the customization document is not global, writing, by the computing system, the base document or the customization document in the tenant repository; and rejecting, by the computing system, the writing when (i) the base document or the customization document is the global document: (ii) the context requesting the base document or the customization document is not global, and (iii) a tenant customization layer is not configured.

2. The method of claim 1, wherein the global repository and the tenant repository are separate databases or file systems.

3. The method of claim 1, further comprising processing, by the computing system, an application request using the base document.

4. The method of claim 1, wherein the accessing the base document from the global repository includes reading the base document from the global repository, and the accessing the base document from the tenant repository includes reading the base document from the tenant repository.

5. The method of claim 4, further comprising:
when the base document is not the global document and prior to reading the base document from the tenant repository, determining, by the computing system, whether a context requesting to read the base document is global;
when (i) the base document is not the global document, and (ii) the context requesting the base document is global, rejecting, by the computing system, the read; and
when (i) the base document is not the global document, and (ii) the context requesting the base document is not global, reading, by the computing system, the base document from the tenant repository.

6. The method of claim 4, further comprising:
determining, by the computing system, whether there is the customization document to be read;
when there is the customization document to be read, determining, by the computing system, whether the customization document to be read is a global customization document;
when the customization document is the global customization document, reading, by the computing system, the customization document from the global repository; and
when the customization document is not the global customization document, reading, by the computing system, the customization document from the tenant repository.

7. The method of claim 6, wherein the determining whether the customization document to be read is the global customization document includes analyzing a layer name of the customization document to determine whether the layer name is identified as global.

8. The method of claim 6, further comprising processing, by the computing system, an application request using at least one of the base document and the customization document.

9. The method of claim 7, further comprising:
when the customization document is not the global customization document and prior to reading the customization document from the tenant repository, determining, by the computing system, whether the context requesting to read the customization document is global;
when (i) the customization document is not the global customization document, and (ii) the context requesting the customization document is global, rejecting, by the computing system, the read; and
when (i) the customization document is not the global customization document, and (ii) the context requesting the customization document is not global, reading, by the computing system, the customization document from the tenant repository.

10. The method of claim 1, further comprising writing, by the computing system, changes to metadata of the base document or the customization document as a customization when (i) the base document or the customization document is the global document; (ii) the context requesting the base document or the customization document is not global, and (iii) a tenant customization layer is configured.

11. A non-transitory machine readable storage medium having instructions stored thereon that when executed by one or more processors cause the one or more processors to perform a method comprising:
determining whether a base document or a customization document to be accessed is a global document wherein the determining, whether the base document to be accessed is the global document includes analyzing a namespace of the base document to determine whether the namespace is identified as global;
when the base document is the global document, accessing the base document from a global repository shared amongst tenants of a multi-tenant system; and
when the base document is not the global document, accessing the base document from a tenant repository that is accessible by a tenant of the multi-tenant system, wherein the tenant repository is isolated from other tenants of the multi-tenant system;
determining whether a context requesting access to the base document or the customization document is global;
when (i) the base document or the customization document to be accessed is the global document, and (ii) the context requesting access to the base document or the customization document is global, writing the base document or the customization document in the global repository;
when (i) the base document or the customization document is not the global document, and (ii) the context requesting access to the base document or the customization document is not global, writing the base document or the customization document in the tenant repository; and
rejecting the writing when (i) the base document or the customization document is the global document; (ii) the context requesting the base document or the customization document is not global, and (iii) a tenant customization layer is not configured.

12. The non-transitory machine readable storage medium of claim 11, wherein:
the accessing the base document from the global repository includes reading the base document from the global repository;
the accessing the base document from the tenant repository includes reading the base document from the tenant repository; and
the method further comprises processing an application request using the base document .

13. The non-transitory machine readable storage medium of claim 11, wherein
the method further comprises
processing an application request using the base document or the customization document.

14. A system comprising:
one or more processors; and a memory coupled to the one or more processors, the memory storing a plurality of instructions executable by the one or more processors, the plurality of instructions comprising instructions that when executed by the one or more processors cause the one or more processors to perform processing comprising:

determining whether a base document or a customization document to be accessed is a global document, wherein the determining, whether the base document to be accessed is the global document, includes analyzing a namespace of the base document to determine whether the namespace is identified as global;

accessing the base document from a global repository shared amongst tenants of a multi-tenant system when the base document is the global document;

accessing the base document from a tenant repository that is accessible by a tenant of the multi-tenant system when the base document is not the global document, wherein the tenant repository is isolated from other tenants of the multi-tenant system;

determining whether a context requesting access to the base document or the customization document is global;

when (i) the base document or the customization document to be accessed is the global document, and (ii) the context requesting access to the base document or the customization document is global, writing the base document or the customization document in the global repository;

when (i) the base document or the customization document is not the global document, and (ii) the context requesting access to the base document or the customization document is not global, writing the base document or the customization document in the tenant repository; and rejecting the writing when (i) the base document or the customization document is the global document; (ii) the context requesting the base document or the customization document is not global, and (iii) a tenant customization layer is not configured.

15. The system of claim 14, wherein:
the accessing the base document from the global repository includes reading the base document from the global repository;
the accessing the base document from the tenant repository includes reading the base document from the tenant repository; and
the processing further comprises processing an application request using the base document.

16. The system of claim 14, wherein the processing further comprises processing an application request using the base document or the customization document.

* * * * *

UNITED STATES PATENT AND TRADEMARK OFFICE
CERTIFICATE OF CORRECTION

PATENT NO. : 10,503,787 B2  
APPLICATION NO. : 15/268174  
DATED : December 10, 2019  
INVENTOR(S) : Nagaraj et al.

Page 1 of 1

It is certified that error appears in the above-identified patent and that said Letters Patent is hereby corrected as shown below:

On the Title Page

In Column 2, under Abstract, Line 12, delete "futher" and insert -- further --, therefor.

In the Specification

In Column 11, Line 27, delete "Is" and insert -- In --, therefor.

In Column 15, Line 14, delete "paritions" and insert -- partitions --, therefor.

In Column 24, Line 4, delete "srchitecture" and insert -- architecture --, therefor.

In the Claims

In Column 28, Line 46, in Claim 1, after "system;" delete "and".

In Column 29, Line 3, in Claim 1, delete "document:" and insert -- document; --, therefor.

In Column 30, Line 18, in Claim 11, delete "document" and insert -- document, --, therefor.

In Column 30, Line 20, in Claim 11, delete "document" and insert -- document, --, therefor.

In Column 30, Line 25, in Claim 11, after "system;" delete "and".

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*